United States Patent
Aisaka et al.

(10) Patent No.: US 12,469,130 B2
(45) Date of Patent: Nov. 11, 2025

(54) PATHOLOGY IMAGE DIAGNOSIS SUPPORT APPARATUS, PATHOLOGY IMAGE DIAGNOSIS SUPPORT METHOD, AND PATHOLOGY IMAGE DIAGNOSIS SUPPORT SYSTEM

(71) Applicant: Sony Group Corporation, Tokyo (JP)

(72) Inventors: Kazuki Aisaka, Tokyo (JP); Shinji Watanabe, Tokyo (JP); Toya Teramoto, Tokyo (JP)

(73) Assignee: Sony Group Corporation, Tokyo (JP)

( * ) Notice: Subject to any disclaimer, the term of this patent is extended or adjusted under 35 U.S.C. 154(b) by 471 days.

(21) Appl. No.: 17/921,649

(22) PCT Filed: Apr. 16, 2021

(86) PCT No.: PCT/JP2021/015659
§ 371 (c)(1),
(2) Date: Oct. 27, 2022

(87) PCT Pub. No.: WO2021/230000
PCT Pub. Date: Nov. 18, 2021

(65) Prior Publication Data
US 2023/0169647 A1    Jun. 1, 2023

(30) Foreign Application Priority Data
May 15, 2020  (JP) .................... 2020-086128

(51) Int. Cl.
*G06T 7/00* (2017.01)
*G01N 33/483* (2006.01)
(Continued)

(52) U.S. Cl.
CPC ....... *G06T 7/0012* (2013.01); *G01N 33/4833* (2013.01); *G06V 10/776* (2022.01);
(Continued)

(58) Field of Classification Search
None
See application file for complete search history.

(56) References Cited

U.S. PATENT DOCUMENTS

2018/0046759 A1  2/2018  Barral
2018/0301217 A1  10/2018  Barral
(Continued)

FOREIGN PATENT DOCUMENTS

CN  109564622 A   4/2019
EP  3674686 A1   7/2020
(Continued)

OTHER PUBLICATIONS

International Search Report and Written Opinion mailed on Jul. 6, 2021, received for PCT Application PCT/JP2021/015659, Filed on Apr. 16, 2021, 13 pages including English Translation.
(Continued)

*Primary Examiner* — Lennin R Rodriguezgonzalez
(74) *Attorney, Agent, or Firm* — XSENSUS LLP

(57) ABSTRACT

An estimation result can be more effectively utilized. An information processing apparatus includes a deriving unit (100) that derives an estimation result of diagnosis for a second pathology image using a trained model on which learning has performed using training data including a plurality of first pathology images, and an identifying unit (100) that identifies a basis image that serves as a basis for derivation of the estimation result by the trained model from the plurality of first pathology images.

20 Claims, 21 Drawing Sheets

(51) Int. Cl.
  *G06V 10/776* (2022.01)
  *G16H 30/40* (2018.01)
  *G16H 50/20* (2018.01)

(52) U.S. Cl.
  CPC ............ *G16H 30/40* (2018.01); *G16H 50/20* (2018.01); *G06T 2207/10056* (2013.01); *G06T 2207/30004* (2013.01); *G06V 2201/03* (2022.01)

(56) References Cited

U.S. PATENT DOCUMENTS

2019/0198160 A1  6/2019  Barral
2020/0160027 A1  5/2020  Tsujimoto

FOREIGN PATENT DOCUMENTS

| JP | 2015-38467 A | 2/2015 |
| JP | 2018-194881 A | 12/2018 |
| JP | 2019-533847 A | 11/2019 |
| JP | 2020-115292 A | 7/2020 |
| KR | 10-2020-0019250 A | 2/2020 |
| WO | 2013/179723 A1 | 12/2013 |
| WO | 2018/031674 A1 | 2/2018 |
| WO | 2019/039035 A1 | 2/2019 |
| WO | WO-2019232027 A1 | 12/2019 |

OTHER PUBLICATIONS

Liu et al., "Detecting Cancer Metastases on Gigapixel Pathology Images", arXiv:1703.02442v2 [cs.CV], Mar. 8, 2017, 13 pages.
Koh et al., "Understanding Black-box Predictions via Influence Functions", Proceedings of the 34th International Conference on Machine Learning, 2017, vol. 70, pp. 1885-1894.

| SAMPLING | CENTER COORDINATES | MAGNIFICATION | TIME |
|---|---|---|---|
| 1 | (X1,Y1) | 1.25 | 0:00:00 |
| 2 | (X2,Y2) | 1.25 | 0:00:30 |
| 3 | (X2,Y2) | 20 | 0:01:00 |
| 4 | (X2,Y2) | 20 | 0:01:30 |
| 5 | (X3,Y3) | 20 | 0:02:00 |
| 6 | (X3,Y3) | 40 | 0:02:30 |
| 7 | (X3,Y3) | 40 | 0:03:00 |
| 8 | (X3,Y3) | 40 | 0:03:30 |
| ... | ... | ... | ... |

| PATIENT ID | DOCTOR ID | PATHOLOGY IMAGE | DIAGNOSIS RESULT | GRADE | TISSUE TYPE | GENETIC EXAMINATION | ULTRASONIC EXAMINATION | MEDICATION |
|---|---|---|---|---|---|---|---|---|
| XXX1 | YYY1 | Img1 | BREAST CANCER | 1 | DUCTAL CARCINOMA IN SITU | ER- | XXX | |
| XXX2 | YYY2 | Img2 | NORMAL | - | - | - | - | - |
| XXX3 | YYY3 | Img3 | BREAST CANCER | 3 | INVASIVE DUCTAL CARCINOMA | ER+ | YYY | XXX ADMINISTRATION |
| XXX4 | YYY4 | ... | ... | ... | ... | ... | ... | ... |

| PATIENT ID | DOCTOR ID | PATHOLOGY IMAGE | DIAGNOSIS RESULT | GRADE | TISSUE TYPE | GENETIC EXAMINATION | ULTRASONIC EXAMINATION | MEDICATION |
|---|---|---|---|---|---|---|---|---|
| XXX1 | YYY1 | Img1 | LUNG CANCER | T1cN1 | SQUAMOUS CELL CARCINOMA | EGFR MUTATION | XXX | |
| XXX2 | YYY2 | Img2 | NORMAL | - | - | - | - | - |
| XXX3 | YYY3 | Img3 | LUNG CANCER | T3M1a | SMALL CELL CARCINOMA | ALK FUSION GENE | YYY | XXX ADMINISTRATION |
| XXX4 | YYY4 | ... | ... | ... | ... | ... | ... | ... |

| PATIENT ID | DOCTOR ID | PATHOLOGY IMAGE | DIAGNOSIS RESULT | GRADE | TISSUE TYPE | GENETIC EXAMINATION | ULTRASONIC EXAMINATION | MEDICATION |
|---|---|---|---|---|---|---|---|---|
| XXX1 | YYY1 | Img1 | ULCERATIVE COLITIS | 1 | - | - | - | XXX |
| XXX2 | YYY2 | Img2 | NORMAL | - | - | - | - | - |
| XXX3 | YYY3 | Img3 | ULCERATIVE COLITIS | 2 | - | - | YYY | XXX ADMINISTRATION |
| XXX4 | YYY4 | ... | ... | ... | ... | ... | ... | ... |

PATHOLOGY IMAGE DIAGNOSIS SUPPORT APPARATUS, PATHOLOGY IMAGE DIAGNOSIS SUPPORT METHOD, AND PATHOLOGY IMAGE DIAGNOSIS SUPPORT SYSTEM

CROSS-REFERENCE TO RELATED APPLICATIONS

The present application is based on PCT filing PCT/JP2021/015659, filed Apr. 16, 2021, which claims priority to Japanese Application No. 2020-086128, filed May 15, 2020, the entire contents of each are incorporated herein by reference.

FIELD

The present disclosure relates to an information processing apparatus, an information processing method, and an information processing system.

BACKGROUND

In recent years, technology for supporting diagnosis by a doctor or the like by outputting an estimation result of diagnosis by a learning model from a medical image that is a pathology image or the like has been developed.

CITATION LIST

Patent Literature

Patent Literature 1: JP 2015-38467 A

Non Patent Literature

Non Patent Literature 1: Yun Liu, Krishna Gadepalli, Mohammad Norouzi, George E. Dahl, Timo Kohlberger, Aleksey Boyko, Subhashini Venugopalan, Aleksei Timofeev, Philip Q. Nelson, Gregory S. Corrado, Jason D. Hipp, Lily Peng, Martin C. Stumpe: Detecting Cancer Metastases on Gigapixel Pathology Images. CoRR abs/1703.02442 (2017)

SUMMARY

Technical Problem

However, in the above-described conventional technology, only an estimation result of diagnosis derived using a learning model or the like is output, and a basis for derivation of the estimation result is not presented. Therefore, a user such as a doctor cannot determine whether the estimation result derived by the learning model is based on a correct estimation, and cannot sufficiently and effectively utilize the estimation result.

Therefore, the present disclosure proposes an information processing apparatus, an information processing method, and an information processing system capable of more effectively utilizing an estimation result.

Solution to Problem

To solve the problems described above, an information processing apparatus according to an embodiment of the present disclosure includes: a deriving unit that derives an estimation result of diagnosis for a second pathology image using a trained model on which learning has performed using training data including a plurality of first pathology images; and an identifying unit that identifies a basis image that serves as a basis for derivation of the estimation result by the trained model from the plurality of first pathology images.

BRIEF DESCRIPTION OF DRAWINGS

FIG. 8 is a diagram illustrating an example of a browsing history storage unit included in a server.

FIG. 9A is a diagram illustrating a diagnosis information storage unit included in a medical information system.

FIG. 9B is a diagram illustrating a diagnosis information storage unit included in the medical information system.

FIG. 9C is a diagram illustrating a diagnosis information storage unit included in the medical information system.

DESCRIPTION OF EMBODIMENTS

Figure 1:
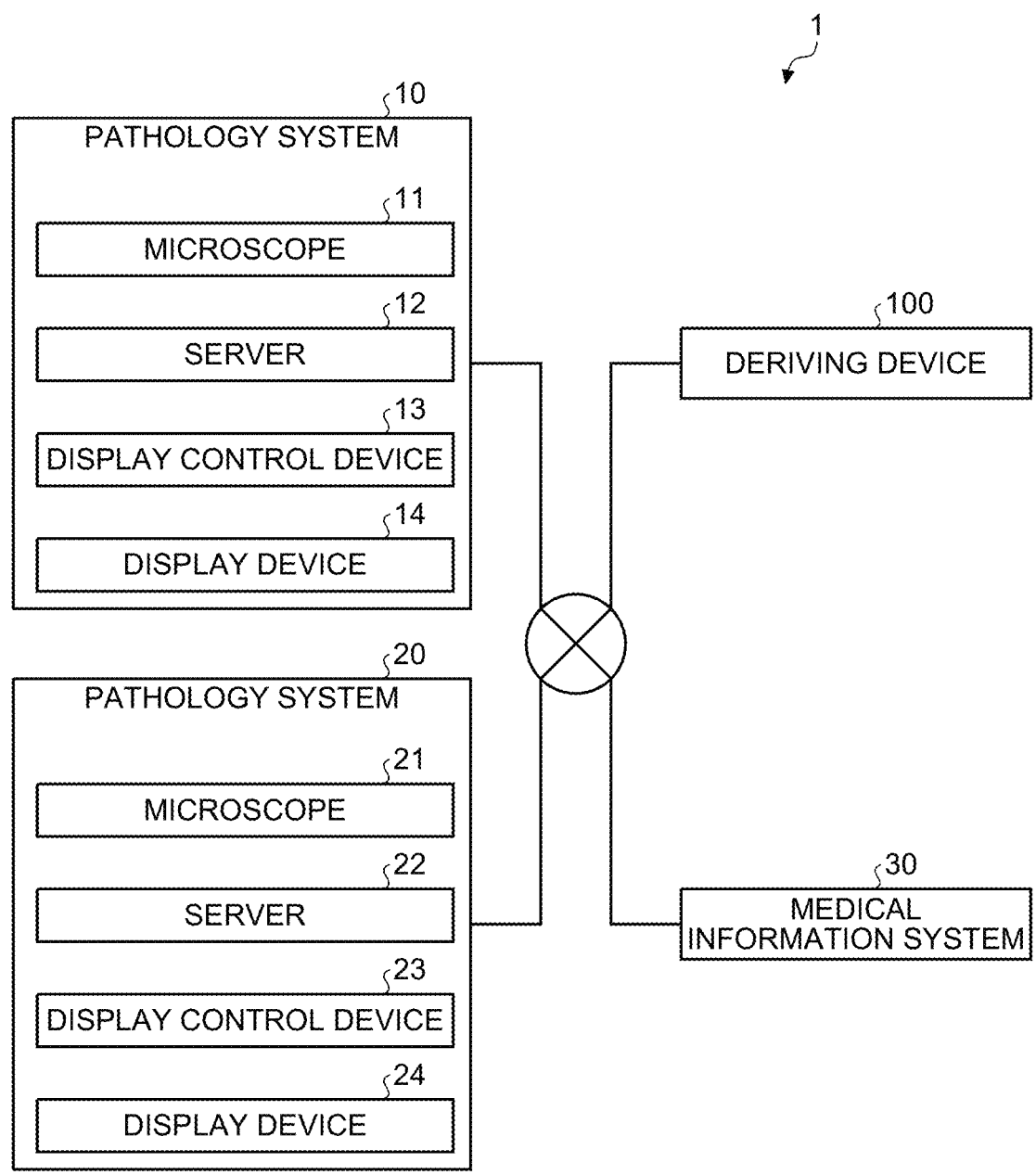
FIG. 1 is a diagram illustrating a diagnosis support system according to one embodiment.

Hereinafter, embodiments of the present disclosure will be described in detail with reference to the drawings. Note that, in the following embodiments, the same parts are denoted by the same reference numerals, and duplicate description will be omitted.

The present disclosure will be described according to the following order of items.

1. One embodiment
1-1. System configuration
1-2. Various types of information
1-2-1. Pathology image
1-2-2. Browsing history information
1-2-3. Diagnosis information
1-3. Deriving device
1-4. Flow of diagnosis support information generation
1-5. Identification method for basis image
1-5-1. First identification method
1-5-2. Second identification method
1-5-3. Third identification method
1-5-4. Fourth identification method
1-5-5. Other identification methods
1-6. Display control device
1-6-1. Example of diagnosis support UI screen
1-6-2. Modification of diagnosis support UI screen
1-7. Processing procedure
1-7-1. Learning processing procedure
1-7-2. Deriving processing procedure
1-8. Action and effect
2. Other embodiments
2-1. Display device
2-2. Imaging device
2-3. Server
2-4. Pathology image
2-5. Hardware configuration (1. One Embodiment)

[1-1. System Configuration]

First, a diagnosis support system (information processing system and information processing apparatus) according to one embodiment will be described with reference to FIG. 1. FIG. 1 is a diagram illustrating the diagnosis support system according to the present embodiment. As illustrated in FIG. 1, a diagnosis support system 1 includes a pathology system 10, a pathology system 20, a medical information system 30, and a deriving device 100.

The pathology system 10 is a system mainly used by a pathologist, and is applied to, for example, a laboratory or a hospital. As illustrated in FIG. 1, the pathology system 10 includes a microscope 11, a server 12, a display control device 13, and a display device 14.

The microscope 11 is an imaging device that has a function of an optical microscope, images a specimen that is an observation target placed on a glass slide, and acquires pathology images (example of medical images) that are digital images.

Here, the specimen that is an observation target may be prepared for the purpose of pathological diagnosis or the like from a biologically derived sample (hereinafter, referred to as a biological sample) such as a specimen or a tissue sample collected from a human body. The specimen may be a tissue section, a cell, or a fine particle, and regarding the specimen, the type of used tissue (for example, organ or the like), the type of target disease, the attribute of the subject (for example, age, sex, blood type, race, or the like), or the lifestyle of the subject (for example, dietary habits, exercise habits, smoking habits, or the like) is not particularly specified. Note that the tissue section may include, for example, a section before staining of a tissue section to be stained (hereinafter, also simply referred to as a section), a section adjacent to the stained section, a section different from the stained section in the same block (sampled from the same place as the stained section), a section in a different block in the same tissue (sampled from a different place from the stained section), a section collected from a different patient, and the like.

The server 12 is a device that stores and saves pathology images obtained by imaging by the microscope 11 in a storage unit (not illustrated). In a case where a browsing request is received from the display control device 13, the server 12 searches for a pathology image from the storage unit (not illustrated) and transmits the pathology image obtained by the search to the display control device 13.

The display control device 13 transmits a browsing request for a pathology image received from a user such as a doctor or a pathologist to the server 12. Then, the display control device 13 controls the display device 14 so that the pathology image received from the server 12 is displayed.

The display device 14 includes a screen in which, for example, liquid crystal, electro-luminescence (EL), cathode ray tube (CRT), or the like is used. The display device 14 may be compatible with 4K or 8K, or may be formed using a plurality of display devices. The display device 14 displays the pathology image caused to be displayed by control of the display control device 13. Furthermore, the server 12 stores browsing history information regarding regions of pathology images observed by a pathologist via the display device 14. The browsing history information may be, for example, information regarding browsing histories of pathology images acquired by a user such as a doctor or a pathologist in past cases.

The pathology system 20 is a system applied to a hospital different from the pathology system 10. The pathology system 20 includes a microscope 21, a server 22, a display control device 23, and a display device 24. Each unit included in the pathology system 20 is similar to that of the pathology system 10, and thus description thereof is omitted.

The medical information system 30 is a system that stores information regarding diagnosis of a patient. For example, in a case where a disease state is difficult to be diagnosed from an image alone in an endoscopic examination or the like at a predetermined hospital, a biopsy may be performed to perform a definite diagnosis by pathological diagnosis. A specimen formed from tissue collected from a patient is imaged by the microscope 11 of the pathology system 10, and pathology images obtained by imaging are saved in the server 12. The pathology images are displayed on the display device 14 by the display control device 13, and pathological diagnosis is performed by a pathologist using the pathology system 10. A doctor performs a definite diagnosis on the basis of the pathological diagnosis result, and the definite diagnosis result is stored in the medical information system 30. The medical information system 30 stores information regarding diagnosis, such as information for identifying a patient, patient disease information, examination information and image information used for diagnosis, a diagnosis result, and prescription medicine. Note that the medical information system 30 is referred to as an electronic medical record system or the like.

Incidentally, the accuracy of pathological diagnosis varies depending on the pathologist. A diagnosis result by pathology images may vary depending on the pathologist, specifically, depending on the years of experience and expertise of the pathologist. For this reason, diagnosis support information that is information for supporting diagnosis using machine learning is desired to be derived for the purpose of supporting pathological diagnosis.

As diagnosis support using machine learning, for example, it is conceivable to train a learning model using pathology images acquired in past cases and diagnosis information given by a doctor, a pathologist, or the like for the cases as training data, and to derive an estimation result of diagnosis for a pathology image to be newly diagnosed by inputting the pathology image to a learning model on which learning has performed (hereinafter, referred to as a trained model).

However, whether the estimation result is correct is difficult to be determined by a user such as a doctor or a pathologist in a case where only the estimation result output from the trained model is presented to the user. That is, as long as from which feature in the input image the estimation result has been derived cannot be known, the user cannot determine the reliability of the estimation result, and thus, whether diagnosis should be performed with reference to the estimation result is difficult to be determined.

Therefore, in the present embodiment, in addition to the estimation result by the trained model, a pathology image or a partial region thereof that has been important in deriving the estimation result is presented to the user as a basis image. As a result, the user can determine the reliability of the estimation result on the basis of the basis image, and thus more accurate diagnosis can be performed on a case.

Note that, in the present embodiment, information regarding diagnosis performed on cases of pathology images used as training data in the past may be associated with the pathology images as diagnosis information. The diagnosis information may include information regarding a doctor who has performed the diagnosis, a diagnosis result issued by the doctor, results of various examinations performed for the diagnosis, information regarding a patient of the case, information regarding an annotation area given to the corresponding pathology image, and the like. Then, in the present embodiment, diagnosis information associated with a pathology image picked up as a basis image is presented to a user together with an estimation result and the basis image. As a result, the user can perform diagnosis with reference to a past case, and thus more accurate diagnosis can be performed on a case.

Furthermore, in the present embodiment, pathology images used as training data are pathology images included in groups of tile images having a pyramid structure created for each case. Although details of the groups of tile images having a pyramid structure will be described below, the tile image groups are schematically image groups including pathology images that are more highly enlarged and high-resolution towards the lower layer. In the same case, the image groups of respective layers represent the same entire specimen. In the present description, the entire image including an image group in the lowermost layer, in other words, the highest magnification is referred to as a whole slide image.

Therefore, in the present embodiment, a whole slide image of a specimen may be acquired from a pathology image in which a part of the specimen picked up as a basis image is displayed, and the acquired whole slide image may be presented to a user. As a result, the user can perform more accurate diagnosis on the case.

Furthermore, in the present embodiment, information regarding browsing histories of the groups of tile images (hereinafter, referred to as browsing history information) may be presented to a user. The browsing history information may be, for example, information indicating how much (for example, the number of times, the amount of time, and the like) and which doctor has browsed which pathology image in a past case. Furthermore, the browsing history information may be presented to the user in a form such as a heat map for a whole slide image, for example.

An example of processing by the deriving device 100 will be described with reference to an example of FIG. 1. In the example of FIG. 1, it is assumed that information regarding diagnosis by a pathologist is accumulated in the server 12 of the pathology system 10 every day. That is, the server 12 saves first pathology images that are pathology images corresponding to first affected tissue and browsing history information regarding browsing histories of a pathologist for the first pathology images. Furthermore, in the example of FIG. 1, it is assumed that the deriving device 100 provides diagnosis support information to the pathology system 20.

First, the deriving device 100 acquires the first pathology images and the browsing history information for the first pathology images accumulated every day from the server 12 of the pathology system 10. In addition, the deriving device 100 acquires diagnosis information regarding diagnosis results corresponding to the first pathology images from the medical information system 30. The deriving device 100 trains a learning model using the first pathology images and the corresponding diagnosis information as training data, thereby generating a trained model for estimating a diagnosis result from a second pathology image corresponding to second affected tissue different from the first affected tissue. Note that the training data may include the browsing history information for the first pathology images.

Then, it is assumed that the second pathology image corresponding to the second affected tissue is generated by the microscope 21 in the pathology system 20. At this time, when receiving a request to display the second pathology image from a user such as a doctor or a pathologist, the display control device 23 transmits the second pathology image to the deriving device 100. The deriving device 100 derives an estimation result of diagnosis for a case from the second pathology image using the trained model (deriving unit), and outputs the derived estimation result to the display control device 23 as a part of diagnosis support information.

Furthermore, the deriving device (identifying unit) 100 identifies a first pathology image that has been important in deriving the estimation result as a basis image. Furthermore, the deriving device 100 identifies diagnosis information associated with the identified basis image (first pathology image). Then, the deriving device 100 outputs the identified basis image and the diagnosis information to the display control device 23 as a part of diagnosis support information. That is, in the present embodiment, the diagnosis support information can include the estimation result output from the trained model, the basis image, and the diagnosis information.

Note that, as described above, the deriving device 100 may identify a whole slide image of a group of tile images including the basis image and browsing history information regarding the group of tile images of the whole slide image, and output the identified whole slide image and browsing history information to the display control device 23 as a part of diagnosis support information.

As described above, the deriving device 100 identifies a first pathology image that has been important in deriving an estimation result of diagnosis from a second pathology image as a basis image, and further identifies diagnosis information associated with the basis image. Then, the identified basis image and diagnosis information are presented to a user as diagnosis support information together with the derived estimation result. As a result, the user can know what kind of pathology image or diagnosis information the estimation result is derived from, and thus the reliability of the estimation result can be determined. As a result, the user can determine whether the estimation result is accurate, and thus diagnosis can be performed using the estimation result effectively.

At that time, by a whole slide image and browsing history information of a group of tile images including the basis image being provided to the user, more accurate diagnosis by the user can be supported.

Note that, in the above description, an example has been described in which the learning model is trained using pathology images saved in the server 12 of the pathology system 10 as training data, however, the deriving device 100 may train the learning model using pathology images saved in the server 22 of the pathology system 20 as training data, or may train the learning model using both the pathology images saved in the server 12 and the pathology images saved in the server 22 as training data. That is, the deriving device 100 can use pathology images as training data as long as the pathology images have been browsed in the past. Furthermore, in the above description, an example has been described in which the deriving device 100 provides diagnosis support information to the display control device 23, but the deriving device 100 may provide the diagnosis support information to the display control device 13.

Furthermore, in the above example, the pathology system 10 and the pathology system 20 have been separately described, but the pathology system 10 and the pathology system 20 may be the same system. More specifically, the diagnosis support system 1 may include only the pathology system 10. In this case, the deriving device 100 trains the learning model using the first pathology images saved in the server 12 as training data, and provides diagnosis support information to the display control device 13 in response to a request from the display control device 13. Furthermore, the number of pathology systems included in the diagnosis support system 1 may be three or more. In this case, the deriving device 100 may collect pathology images accumulated in each of the pathology systems to generate training data, and train the learning model using the training data. Furthermore, in the above example, the medical information system 30 may be the same system as the pathology system 10 or 20. That is, diagnosis information may be saved in the server 12 or 22.

Note that the deriving device 100 according to the present embodiment may be implemented by a server, a cloud server, or the like disposed on a network, or may be implemented by the server 12/22 disposed in the pathology system 10/20. Alternatively, the deriving device 100 according to the present embodiment may be implemented by being distributedly arranged on a system constructed via a network. For example, a part of the deriving device 100 (for example, a pathology image acquisition unit 131, a diagnosis information acquisition unit 132, and a learning unit 133 in a control unit 130, a storage unit 120, and the like) may be implemented by a server, a cloud server, or the like disposed on a network, and the other part (for example, a deriving unit 134 and the like) may be implemented by the server 12/22 of the pathology system 10/20.

The diagnosis support system 1 has been briefly described above. Hereinafter, a configuration and processing of each device will be described in detail, but first, various types of information (data structure of a pathology image, browsing history information of a pathology image, and diagnosis information) serving as a premise of the description will be described. Note that, in the following, an example will be described in which the deriving device 100 trains the learning model using training data accumulated in the pathology system 10 and provides diagnosis support information to the pathology system 20.

[1-2. Various Types of information]

[1-2-1. Pathology Image]

Figure 2:
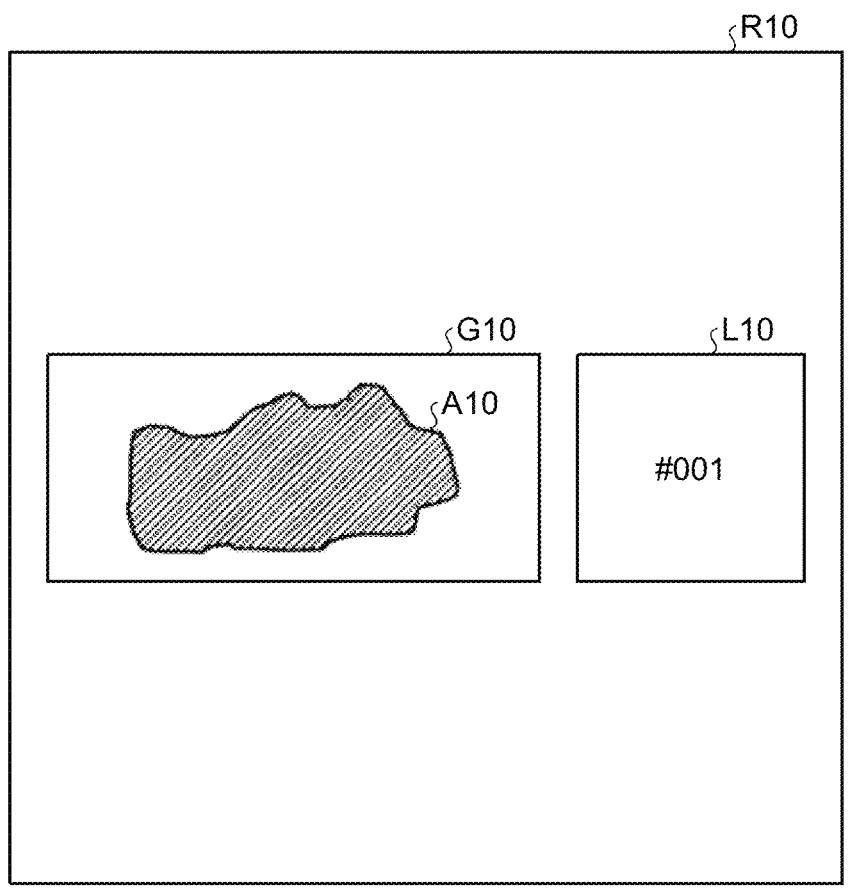
FIG. 2 is a diagram for describing imaging processing according to the one embodiment.
Figure 3:
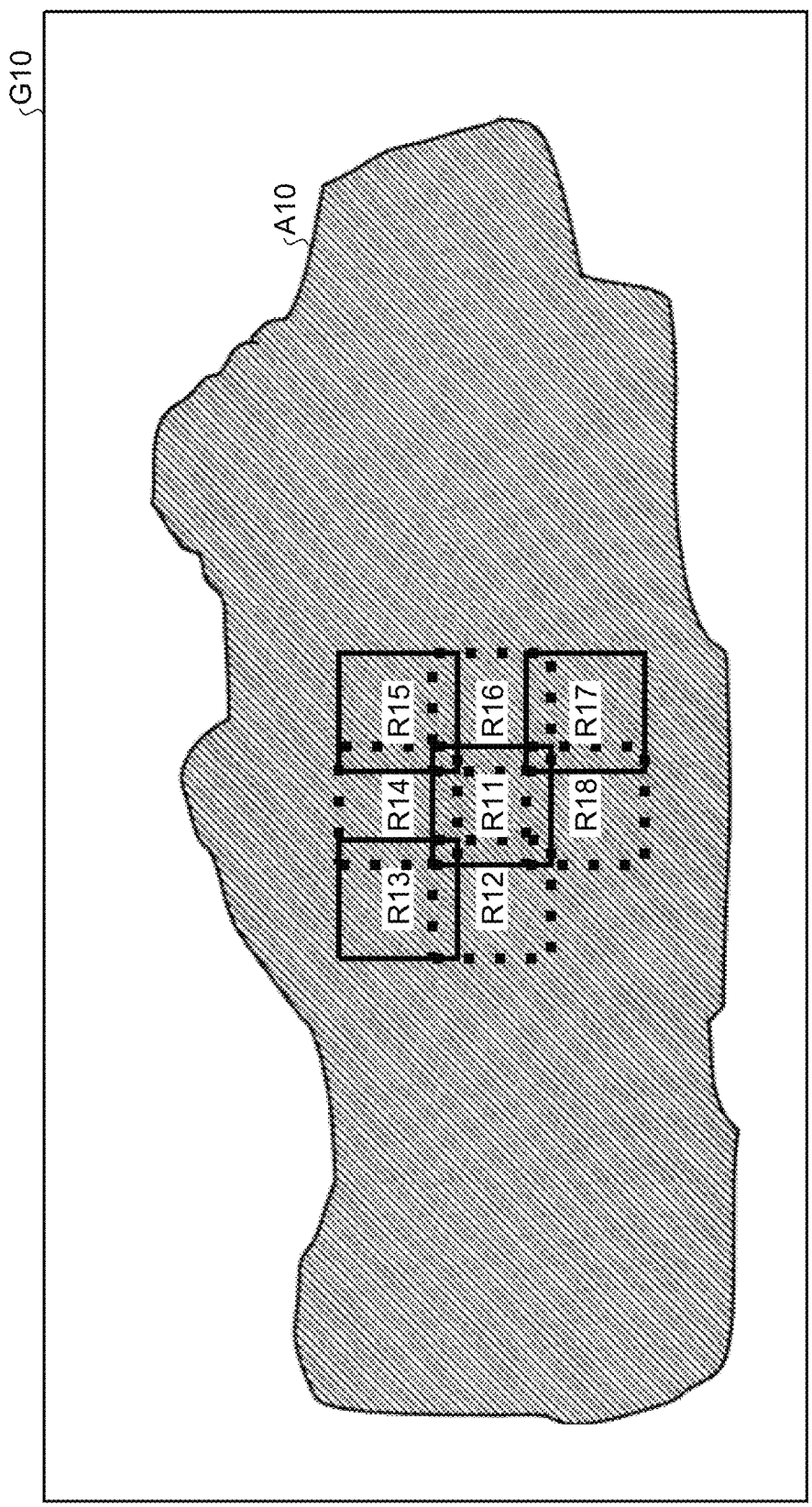
FIG. 3 is a diagram for describing the imaging processing according to the one embodiment.

As described above, pathology images are generated by a specimen being imaged using the microscope 11 or the microscope 21. First, imaging processing using the microscope 11 and the microscope 21 will be described with reference to FIGS. 2 and 3. FIGS. 2 and 3 are diagrams for describing the imaging processing according to the present embodiment. Since the microscope 11 and the microscope 21 perform similar imaging processing, the microscope 11 will be described here as an example. The microscope 11 described below includes a low-resolution imaging unit for imaging with low resolution and a high-resolution imaging unit for imaging with high resolution.

In FIG. 2, a glass slide G10 on which a specimen A10 is placed is included in an imaging region R10 that is a region that can be imaged by the microscope 11. The glass slide G10 is placed on a stage (not illustrated), for example. The microscope 11 generates a whole slide image that is a pathology image of the entire specimen A10 imaged by the imaging region R10 being imaged by the low-resolution imaging unit. In label information L10 illustrated in FIG. 2, identification information for identifying the specimen A10 (for example, a character string or a QR code (registered trademark)) is described. By the identification information described in the label information L10 being associated with the patient, the patient corresponding to the whole slide image can be identified. In the example of FIG. 2, "#001" is described as the identification information. Note that, in the label information L10, for example, a simple description of the specimen A10 may be described.

Subsequently, after generating the whole slide image, the microscope 11 identifies a region where the specimen A10 exists from the whole slide image, and sequentially images each divided region obtained by dividing the region where the specimen A10 exists into a predetermined size by the high-resolution imaging unit. For example, as illustrated in FIG. 3, the microscope 11 first images a region R11, and generates a high-resolution image I11 that is an image illustrating a partial region of the specimen A10. Subsequently, the microscope 11 moves the stage and images a region R12 by the high-resolution imaging unit to generate a high-resolution image I12 corresponding to the region R12. Similarly, the microscope 11 generates high-resolution images I13, I14, . . . corresponding to regions R13, R14, . . . . Although only up to a region R18 is illustrated in FIG. 3, the microscope 11 sequentially moves the stage and images all the divided regions corresponding to the specimen A10 by the high-resolution imaging unit to generate high-resolution images corresponding to the respective divided regions.

Incidentally, when the stage is moved, the glass slide G10 may move on the stage. When the glass slide G10 moves, some of the regions of the specimen A10 may not be imaged.

As illustrated in FIG. 3, the microscope 11 performs imaging by the high-resolution imaging unit such that adjacent divided regions partially overlap each other, and thus, regions can be prevented from not being imaged even when the glass slide G10 moves.

Note that the low-resolution imaging unit and the high-resolution imaging unit described above may be different optical systems or may be the same optical system. In a case of the same optical system, the microscope 11 changes the resolution according to an imaging target. Furthermore, in the above description, an example has been described in which the imaging region is changed by the stage being moved, but the imaging region may be changed by the microscope 11 moving an optical system (high-resolution imaging unit or the like). Furthermore, FIG. 3 illustrates an example in which the microscope 11 performs imaging from the central portion of the specimen A10. However, the microscope 11 may image the specimen A10 in an order different from the imaging order illustrated in FIG. 3. For example, the microscope 11 may perform imaging from the outer peripheral portion of the specimen A10. Furthermore, the example in which only the regions where the specimen A10 exists are imaged by the high-resolution imaging unit has been described above. However, since there is a case where the regions where the specimen A10 exists cannot be accurately detected, the microscope 11 may divide the entire region of the imaging region R10 or the glass slide G10 illustrated in FIG. 2 and perform imaging using the high-resolution imaging unit.

Figure 4:
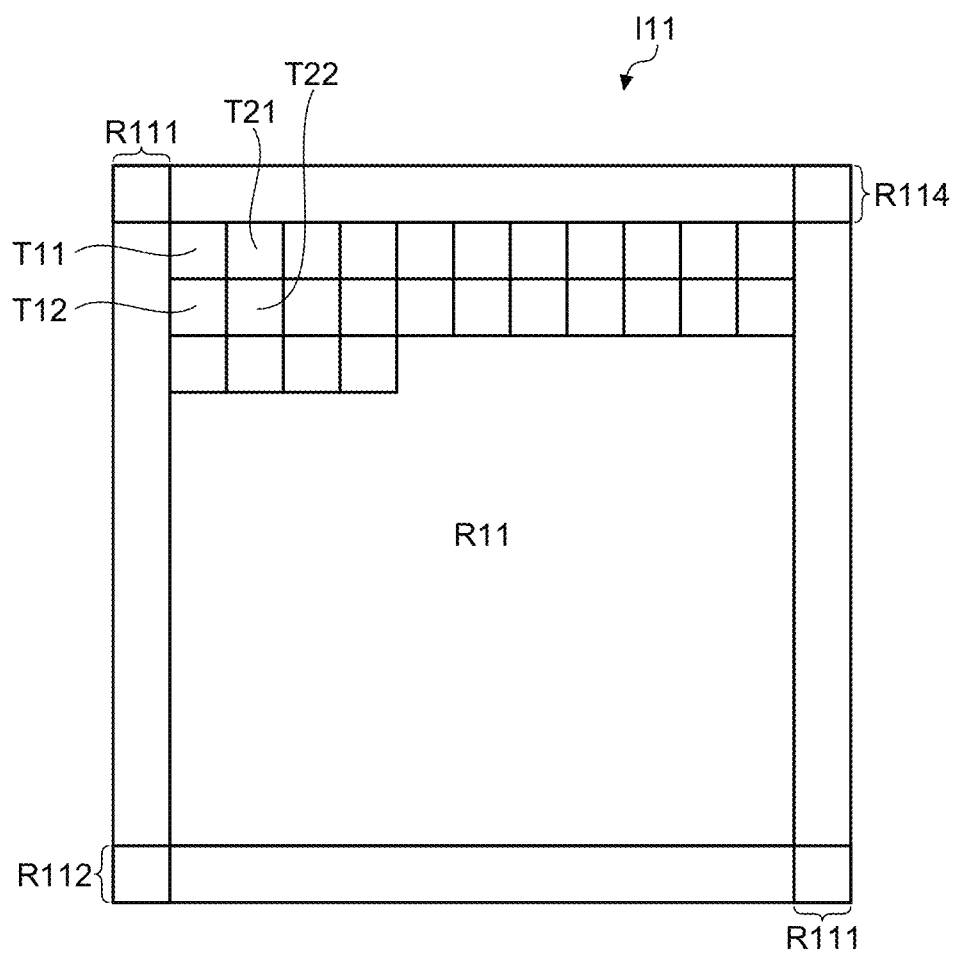
FIG. 4 is a diagram for describing processing of generating partial images (tile images).

Subsequently, each high-resolution image generated by the microscope 11 is divided into a predetermined size. As a result, partial images (hereinafter, referred to as tile images) are generated from a high-resolution image. This point will be described with reference to FIG. 4. FIG. 4 is a diagram for describing processing of generating partial images (tile images). FIG. 4 illustrates the high-resolution image I11 corresponding to the region R11 illustrated in FIG. 3. Note that, in the following description, it is assumed that partial images are generated from a high-resolution image by the server 12. However, the partial images may be generated by a device other than the server 12 (for example, an information processing apparatus provided inside the microscope 11, or the like).

In the example illustrated in FIG. 4, the server 12 generates 100 tile images T11, T12, . . . by dividing the one high-resolution image I11. For example, in a case where the resolution of the high-resolution image I11 is 2560×2560 [pixel], the server 12 generates 100 tile images T11, T12, . . . having resolution of 256×256 [pixel] from the high-resolution image I11. Similarly, the server 12 generates tile images by dividing other high-resolution images into a similar size.

Note that, in the example of FIG. 4, regions R111, R112, R113, and R114 are regions overlapping other adjacent high-resolution images (not illustrated in FIG. 4). The server 12 performs positioning of the overlapping regions by technique such as template matching to perform stitching processing on the adjacent high-resolution images. In this case, the server 12 may generate the tile images by dividing the high-resolution images after the stitching processing. Alternatively, the server 12 may generate tile images of regions other than the regions R111, R112, R113, and R114 before the stitching processing, and generate tile images of the regions R111, R112, R113, and R114 after the stitching processing.

Figure 5:
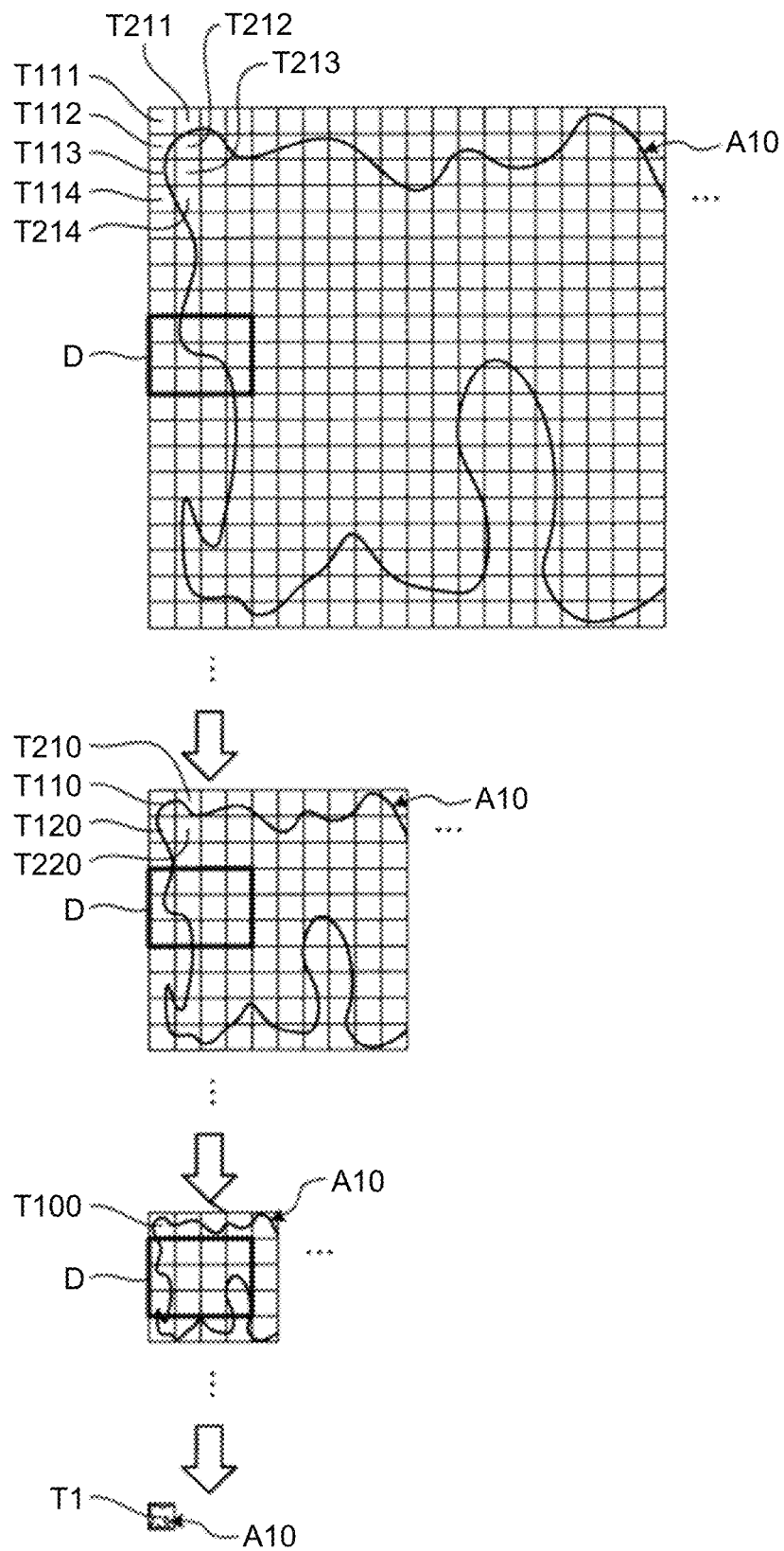
FIG. 5 is a diagram for describing a pathology image according to the one embodiment.
Figure 6:
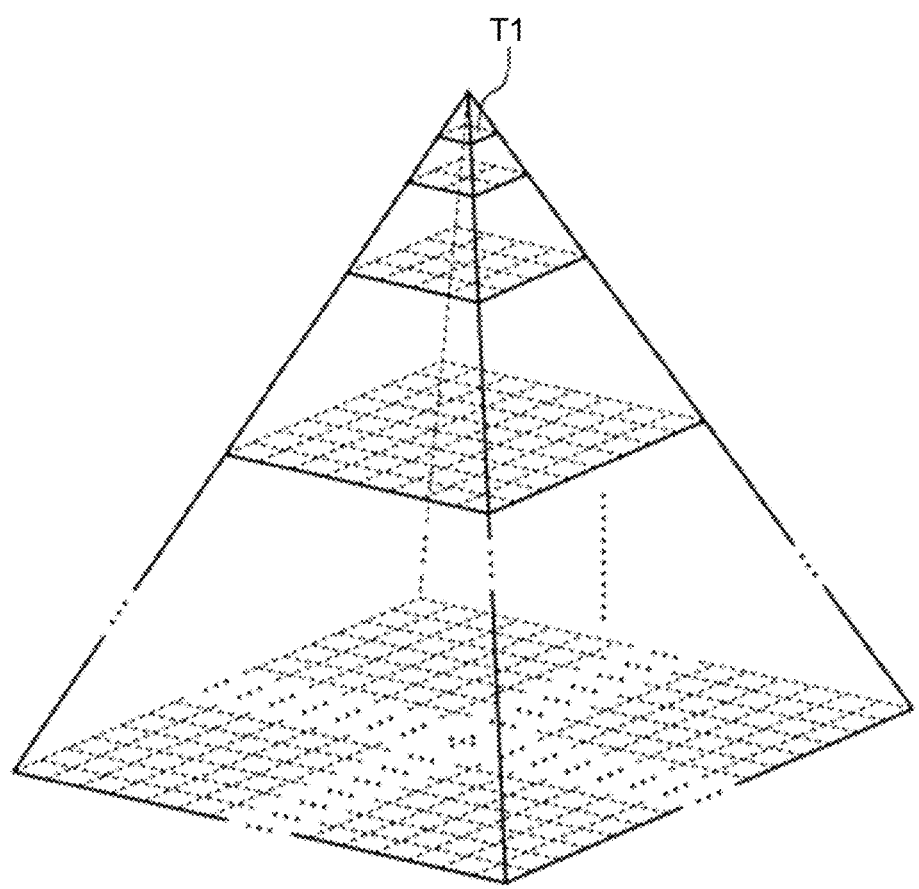
FIG. 6 is a diagram for describing the pathology image according to the one embodiment.

In this manner, the server 12 generates tile images that are the minimum unit of the images obtained by imaging the specimen A10. Then, the server 12 sequentially combines the tile images of the minimum unit to generate tile images having different hierarchies. Specifically, the server 12 generates one tile image by combining a predetermined number of adjacent tile images. This point will be described with reference to FIGS. 5 and 6. FIGS. 5 and 6 are diagrams for describing a pathology image according to the present embodiment.

In the upper part of FIG. 5, a group of tile images of the minimum unit generated from each of the high-resolution images by the server 12 is illustrated. In an example in the upper part of FIG. 5, the server 12 generates one tile image T110 by combining four tile images T111, T112, T211, and T212 adjacent to each other among the tile images. For example, in a case where the resolution of each of the tile images T111, T112, T211, and T212 is 256×256, the server 12 generates the tile image T110 having resolution of 256×256. Similarly, the server 12 generates one tile image T120 by combining four tile images T113, T114, T213, and T214 adjacent to each other. In this manner, the server 12 generates tile images obtained by combining a predetermined number of the tile images of the minimum unit.

Furthermore, the server 12 generates tile images obtained by further combining the tile images adjacent to each other among the tile images obtained by combining the tile images of the minimum unit. In the example in FIG. 5, the server 12 generates one tile image T100 by combining four tile images T110, T120, T210, and T220 adjacent to each other. For example, in a case where the resolution of the tile images T110, T120, T210, and T220 is 256×256, the server 12 generates the tile image T100 having resolution of 256×256. For example, the server 12 generates a tile image having resolution of 256×256 from an image having resolution of 512×512 obtained by combining four tile images adjacent to each other by performing 4-pixel averaging, a weighting filter (processing of reflecting closer pixels more strongly than farther pixels), ½ thinning processing, or the like.

By repeating such combining processing, the server 12 ultimately generates one tile image having resolution similar to the resolution of the tile images of the minimum unit. For example, as in the above example, in a case where the resolution of the tile images of the minimum unit is 256×256, the server 12 ultimately generates one tile image T1 having resolution of 256×256 by repeating the above-described combining processing.

FIG. 6 schematically illustrates the tile images illustrated in FIG. 5. In an example illustrated in FIG. 6, a group of tile images in the lowermost layer is the tile images of the minimum unit generated by the server 12. Furthermore, a group of tile images in the second hierarchy from the bottom is tile images obtained by combining the group of tile images in the lowermost layer. Then, the tile image T1 in the uppermost layer indicates the one tile image to be ultimately generated. In this way, the server 12 generates groups of tile images having a hierarchy like a pyramid structure illustrated in FIG. 6 as a pathology image.

Note that a region D illustrated in FIG. 5 is an example of a region displayed on a display screen such as the display device 14 or 24. For example, it is assumed that the resolution displayable by a display device corresponds to an image having a height of three tile images and a width of four tile images. In this case, as in the region D illustrated in FIG. 5, the level of detail of the specimen A10 displayed on the display device varies depending on the hierarchy to which the tile images that are display targets belong. For example, in a case where the tile images in the lowermost layer are used, a narrow region of the specimen A10 is displayed in detail. Furthermore, a wider region of the specimen A10 is coarsely displayed as tile images in an upper layer are used.

The server 12 stores tile images of each of the hierarchies as illustrated in FIG. 6 in the storage unit (not illustrated). For example, the server 12 stores each of the tile images together with tile identification information from which each of the tile images can be uniquely identified (example of partial image information). In this case, when receiving a tile image acquisition request including tile identification information from another device (for example, the display control device 13 or the deriving device 100), the server 12 transmits a tile image corresponding to the tile identification information to the another device. Furthermore, for example, the server 12 may store each of the tile images together with hierarchy identification information for identifying each of the hierarchies and tile identification information from which each of the tile images can be uniquely identified in the same hierarchy. In this case, when receiving a tile image acquisition request including hierarchy identification information and tile identification information from another device, the server 12 transmits a tile image corresponding to the tile identification information among tile images belonging to a hierarchy corresponding to the hierarchy identification information to the another device.

Note that the server 12 may store the tile images of each of the hierarchies illustrated in FIG. 6 in a storage device other than the server 12. For example, the server 12 may store the tile images of each of the hierarchies in a cloud server or the like. Furthermore, the processing of generating tile images illustrated in FIGS. 5 and 6 may be performed by a cloud server or the like.

Furthermore, the server 12 may not store the tile images of all the hierarchies. For example, the server 12 may store only the tile images in the lowermost layer, may store only the tile images in the lowermost layer and the tile image in the uppermost layer, or may store only the tile images in predetermined hierarchies (for example, odd-numbered hierarchies, even-numbered hierarchies, or the like). At this time, in a case where a tile image in a hierarchy that is not stored is requested from another device, the server 12 generates the tile image requested from the another device by dynamically combining stored tile images. In this manner, the server 12 can prevent the storage capacity from being pressed by thinning out the tile images that is a saving target.

Furthermore, although imaging conditions are not mentioned in the above example, the server 12 may store the tile images of each of the hierarchies as illustrated in FIG. 6 for each of the imaging conditions. Examples of the imaging conditions include a focal length with respect to a subject (such as the specimen A10). For example, the microscope 11 may perform imaging while changing the focal length with respect to the same subject. In this case, the server 12 may store the tile images of each of the hierarchies illustrated in FIG. 6 for each focal length. Note that the reason for changing the focal length is that, since the specimen A10 may be translucent, there are a focal length suitable for imaging the surface of the specimen A10 and a focal length suitable for imaging the inside of the specimen A10. In other words, the microscope 11 can generate a pathology image obtained by imaging the surface of the specimen A10 or a pathology image obtained by imaging the inside of the specimen A10 by changing the focal length.

Furthermore, as another example of the imaging conditions, there is a staining condition for the specimen A10. Specifically, in pathological diagnosis, a specific portion of the specimen A10 (for example, a cell nucleus or the like) may be stained using a luminous material. The luminous material is, for example, a substance that emits light when irradiated with light of a specific wavelength. Furthermore, the same specimen A10 may be stained using different luminous materials. In this case, the server 12 may store the tile images of each of the hierarchies illustrated in FIG. 6 for each of the luminous materials used for staining.

Furthermore, the number and resolution of the tile images described above are merely examples, and can be appropriately changed depending on the system. For example, the number of tile images combined by the server 12 is not limited to four. For example, the server 12 may repeat processing of combining 3×3=9 tile images. Furthermore, in the above example, the resolution of the tile images is 256×256, but the resolution of the tile images may be other than 256×256.

The display control device 13 extracts a desired tile image from groups of tile images having a hierarchical structure according to an input operation by a user via the display control device 13 using software adopting a system applicable to the groups of tile images having a hierarchical structure described above, and outputs the extracted tile image to the display device 14. Specifically, the display device 14 displays an image of any part selected by a user among images of any resolution selected by the user. With such processing, the user can feel as if the user is observing the specimen while changing the observation magnification. That is, the display control device 13 functions as a virtual microscope. The virtual observation magnification here actually corresponds to the resolution.

[1-2-2. Browsing History Information]

Figure 7:
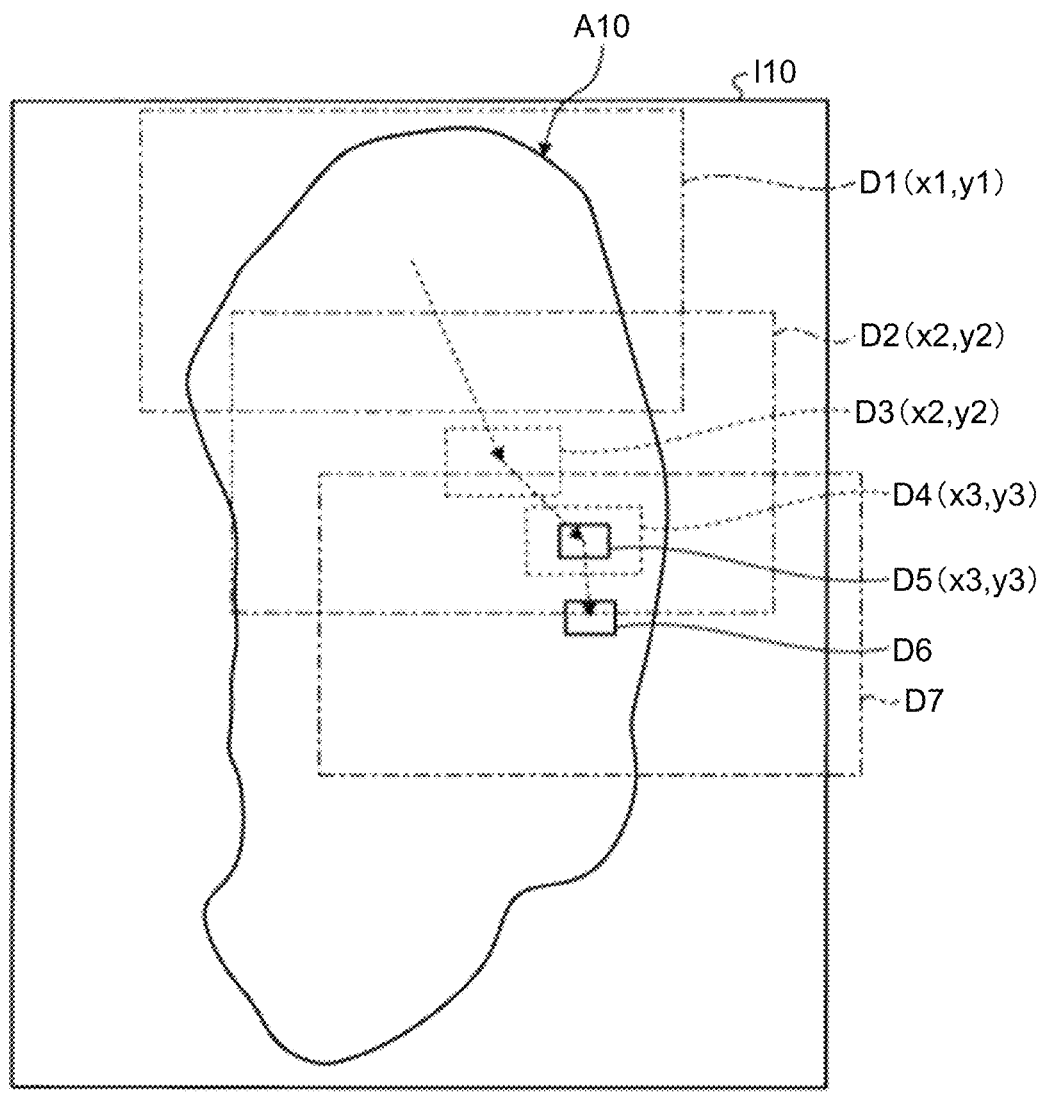
FIG. 7 is a diagram illustrating an example of a browsing mode by a viewer of the pathology image.

Next, browsing history information of a pathology image saved in the server 12 or 22 will be described with reference to FIG. 7. FIG. 7 is a diagram illustrating an example of a browsing mode by a viewer of a pathology image. In the example illustrated in FIG. 7, it is assumed that a viewer such as a pathologist has browsed regions D1, D2, D3, . . . , and D7 in this order in the pathology image 110. In this case, the display control device 13 first acquires a pathology image corresponding to the region D1 from the server 12 according to a browsing operation by the viewer. In response to a request from the display control device 13, the server 12 acquires one or more tile images forming the pathology image corresponding to the region D1 from the storage unit, and transmits the acquired one or more tile images to the display control device 13. Then, the display control device 13 displays the pathology image formed from the one or more tile images acquired from the server 12 on the display device 14. For example, in a case where there is a plurality of tile images, the display control device 13 displays the plurality of tile images side by side. Similarly, each time the viewer performs an operation of changing the display region, the display control device 13 acquires a pathology image corresponding to the region that is a display target (regions D2, D3, . . . , D7, or the like) from the server 12 and displays the acquired pathology image on the display device 14.

In the example of FIG. 7, since the viewer first browses the relatively wide region D1 and there is no region to be carefully observed in the region D1, the viewer moves the browsing region to the region D2. Then, since there is a region to be carefully observed in the region D2, the viewer browses the region D3 by enlarging a partial region of the region D2. Then, the viewer further moves to the region D4 that is a partial region of the region D2. Then, since there is a region to be further carefully observed in the region D4, the viewer browses the region D5 by enlarging a partial region of the region D4. In this manner, the viewer also browses the regions D6 and D7. For example, pathology images corresponding to regions D1, D2, and D7 are display images having a magnification of 1.25 times, pathology images corresponding to regions D3 and D4 are display images having a magnification of 20 times, and pathology images corresponding to regions D5 and D6 are display images having a magnification of 40 times. The display control device 13 acquires and displays tile images of hierarchies corresponding to respective magnifications from the groups of tile images having a hierarchical structure stored in the server 12. For example, a hierarchy of tile images corresponding to regions D1 and D2 is higher than a hierarchy of tile images corresponding to the region D3 (that is, a hierarchy closer to the tile image T1 illustrated in FIG. 6).

While the pathology image is browsed as described above, the display control device 13 acquires browsing information at a predetermined sampling period. Specifically, the display control device 13 acquires the center coordinates and the display magnification of the browsed pathology image at each predetermined timing, and stores the acquired browsing information in the storage unit of the server 12.

This point will be described with reference to FIG. 8. FIG. 8 is a diagram illustrating an example of a browsing history storage unit 12a included in the server 12. As illustrated in FIG. 8, the browsing history storage unit 12a stores information such as "sampling", "center coordinates", "magnification", and "time". The "sampling" indicates an order of timing of storing browsing information. The "center coordinates" indicate position information of a browsed pathology image. In this example, the center coordinates are coordinates indicated by the center position of the browsed pathology image, and correspond to the coordinates of a coordinate system of a group of tile images in the lowermost layer. The "magnification" indicates a display magnification of the browsed pathology image. The "time" indicates elapsed time from the start of browsing. The example of FIG. 8 illustrates that the sampling period is 30 seconds. That is, the display control device 13 saves browsing information in the browsing history storage unit 12a every 30 seconds. However, the present invention is not limited to this example, and the sampling period may be, for example, 0.1 to 10 seconds, or may be out of this range.

In the example of FIG. 8, sampling "1" indicates browsing information of the region D1 illustrated in FIG. 7, sampling "2" indicates browsing information of the region D2, sampling "3" and "4" indicates browsing information of the region D3, sampling "5" indicates browsing information of the region D4, and sampling "6", "7", and "8" indicates browsing information of the region D5. That is, the example of FIG. 8 illustrates that the region D1 is browsed for about 30 seconds, the region D2 is browsed for about 30 seconds, the region D3 is browsed for about 60 seconds, the region D4 is browsed for about 30 seconds, and the region D5 is browsed for about 90 seconds. In this manner, the browsing time of each region can be extracted from the browsing history information.

Furthermore, the number of times each region has been browsed can be extracted from the browsing history information. For example, it is assumed that the number of display times of each pixel of a displayed pathology image is increased by one each time an operation of changing the display region (for example, operation of moving the display region or operation of changing the display size) is performed. For example, in the example illustrated in FIG. 7, in a case where the region D1 is first displayed, the number of display times of each pixel included in the region D1 is one. In a case where the region D2 is displayed next, the number of display times of each pixel included in both the region D1 and the region D2 is two, and the number of display times of each pixel included in the region D2 and not included in the region D1 is one. Since the display region can be identified by the center coordinates and the magnification in the browsing history storage unit 12a being referred to, the number of display times of each pixel (may also be referred to as each of coordinates) of a pathology image can be extracted by the browsing history information stored in the browsing history storage unit 12a being analyzed.

In a case where an operation of changing the display position is not performed by a viewer for a predetermined time (for example, five minutes), the display control device 13 may suspend the storage processing of the browsing information. Furthermore, in the above example, an example has been described in which a browsed pathology image is stored as browsing information using the center coordinates and the magnification, but the present invention is not limited to this example, and the browsing information may be any information as long as a region of the browsed pathology image can be identified from the information. For example, the display control device 13 may store, as the browsing information of the pathology image, tile identification information for identifying a tile image corresponding to the browsed pathology image or information indicating the position of the tile image corresponding to the browsed pathology image. Furthermore, although not illustrated in FIG. 8, information for identifying a patient, a medical record, and the like is stored in the browsing history storage unit 12a. That is, the browsing history storage unit 12a illustrated in FIG. 8 is stored such that the browsing information can be associated with the patient, the medical record, and the like.

[1-2-3. Diagnosis Information]

Next, diagnosis information stored in the medical information system 30 will be described with reference to FIGS. 9A to 9C. FIGS. 9A to 9C are diagrams illustrating diagnosis information storage units included in the medical information system 30. FIGS. 9A to 9C illustrate examples in which diagnosis information is stored in different tables for respective organs that are examination targets. For example, FIG. 9A illustrates an example of a table in which diagnosis information regarding breast cancer examinations is stored, FIG. 9B illustrates an example of a table in which diagnosis information regarding lung cancer examinations is stored, and FIG. 9C illustrates an example of a table in which diagnosis information regarding large intestine examinations is stored.

A diagnosis information storage unit 30A illustrated in FIG. 9A stores information such as "patient ID", "doctor ID", "pathology image", "diagnosis result", "grade", "tissue type", "genetic examination", "ultrasonic examination", and "medication". The "patient ID" indicates identification information for identifying a patient. The "doctor ID" indicates identification information for identifying a doctor. The doctor ID may be associated with years of experience of the doctor, specialized fields, evaluation as a doctor, and the like. The "pathology image" indicates a pathology image saved by a pathologist at the time of diagnosis. In the "pathology image", position information indicating a region of an image that is a saving target with respect to a whole slide image (center coordinates, magnification, and the like) may be stored instead of the image itself. The "diagnosis result" is a diagnosis result by a pathologist, and indicates, for example, the presence or absence of a lesion site and the type of the lesion site. The "grade" indicates the degree of progression of a diseased site. The "tissue type" indicates the type of the diseased site. The "genetic examination" indicates a result of a genetic examination. The "ultrasonic examination" indicates a result of an ultrasonic examination. The medication indicates information regarding medication for the patient.

A diagnosis information storage unit 30B illustrated in FIG. 9B stores information regarding "CT examinations" performed in lung cancer examinations instead of "ultrasonic examinations" stored in the diagnosis information storage unit 30A illustrated in FIG. 9A. A diagnosis information storage unit 30C illustrated in FIG. 9C stores information regarding "endoscopic examinations" performed in large intestine cancer examinations instead of "ultrasonic examinations" stored in the diagnosis information storage unit 30A illustrated in FIG. 9A.

In the examples of FIGS. 9A to 9C, in a case where "normal" is stored in the "diagnosis result", it indicates that the result of the pathological diagnosis is negative, and in a case where information other than "normal" is stored in the "diagnosis result", it indicates that the result of the pathological diagnosis is positive.

[1-3. Deriving Device]

Figure 10:
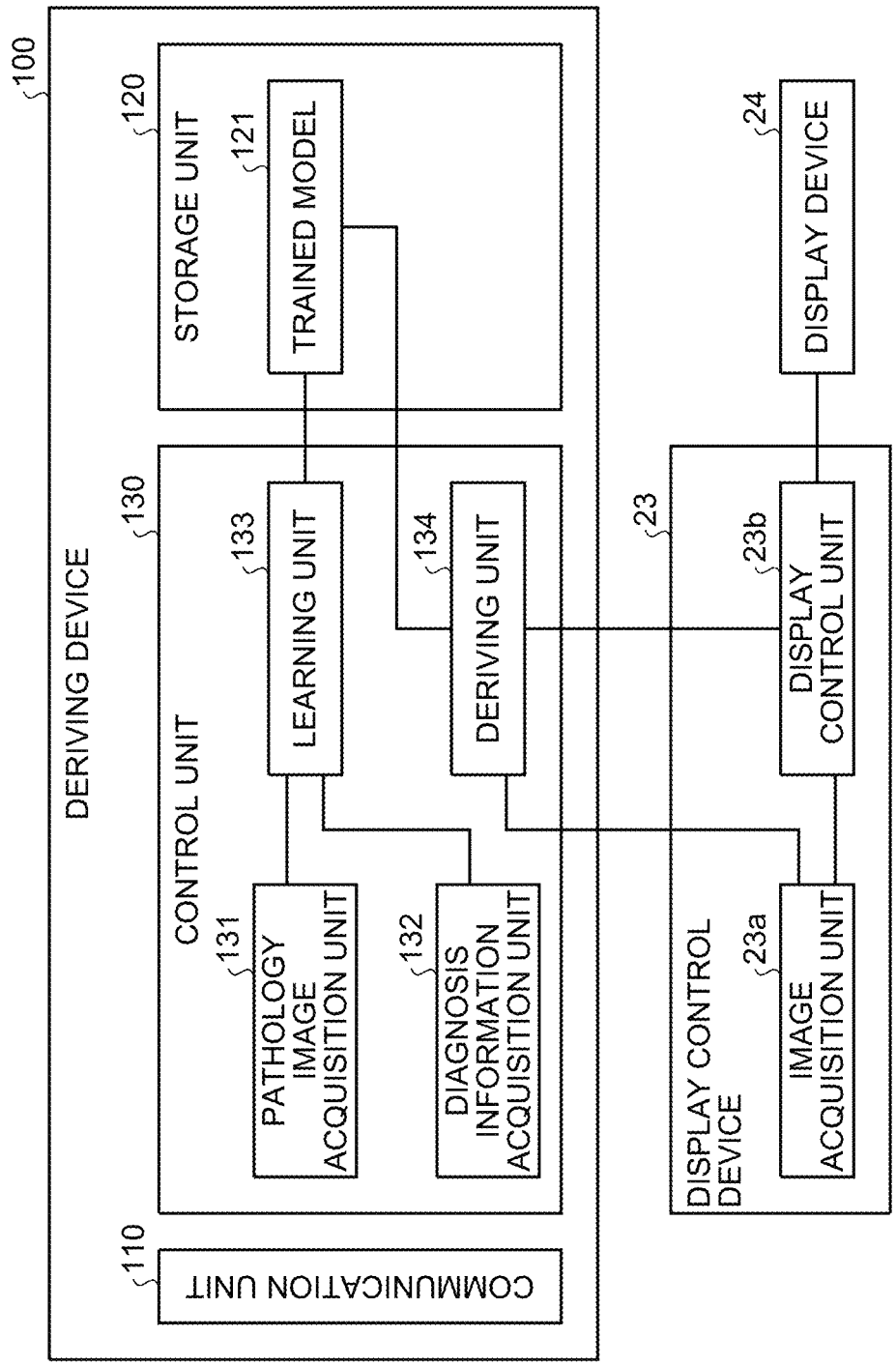
FIG. 10 is a diagram illustrating an example of a deriving device and a display control device according to the one embodiment.

Next, the deriving device 100 according to the present embodiment will be described. Here, the display control device 23 will be described together with the deriving device 100. FIG. 10 is a diagram illustrating an example of the deriving device and the display control device according to the present embodiment. As illustrated in FIG. 10, the deriving device 100 is a computer including a communication unit 110, the storage unit 120, and the control unit 130.

The communication unit 110 is implemented by, for example, a network interface card (NIC) or the like. The communication unit 110 is connected to a network (not illustrated) in a wired or wireless manner, and transmits and receives information to and from the pathology system 10, the pathology system 20, the medical information system 30, and the like via the network. The control unit 130 described below transmits and receives information to and from these devices via the communication unit 110.

The storage unit 120 is implemented by, for example, a semiconductor memory element such as a random access memory (RAM) or a flash memory, or a storage device such as a hard disk or an optical disk. The storage unit 120 stores a trained model 121 generated by the control unit 130. The trained model 121 will be described below.

The control unit 130 is implemented, for example, when a central processing unit (CPU) or a micro processing unit (MPU) performs a program (example of a diagnosis support program) stored in the deriving device 100 using a random access memory (RAM) or the like as a work area. Furthermore, the control unit 130 may be performed by, for example, an integrated circuit such as an application specific integrated circuit (ASIC) or a field programmable gate array (FPGA).

As illustrated in FIG. 10, the control unit 130 includes the pathology image acquisition unit 131, the diagnosis information acquisition unit 132, the learning unit 133, and the deriving unit 134, and implements or performs a function and an action of information processing described below. Note that the internal configuration of the control unit 130 is not limited to the configuration illustrated in FIG. 10, and may be another configuration as long as the configuration performs the information processing to be described below.

The pathology image acquisition unit 131 acquires pathology images that are one piece of training data used for training of a learning model performed by the learning unit 133 via the communication unit 110. Specifically, the pathology image acquisition unit 131 acquires first pathology images corresponding to first affected tissue stored in the server 12 of the pathology system 10. Furthermore, in a case where browsing history information is used as training data, the pathology image acquisition unit 131 also acquires the browsing history information regarding browsing of the first pathology images from the server 12. In this case, as in the example illustrated in FIG. 8, the browsing history information acquired by the pathology image acquisition unit 131 includes information regarding regions of the first pathology images that have been enlarged and browsed by a pathologist, information regarding regions of the first pathology images that have been browsed for relatively a long time by the pathologist, and information regarding the number of times the pathologist has browsed each region of the first pathology images.

The diagnosis information acquisition unit 132 acquires diagnosis information that is one piece of training data used for training of the learning model performed by the learning unit 133 via the communication unit 110. Specifically, the diagnosis information acquisition unit 132 acquires diagnosis information for the first affected tissue corresponding to the first pathology images from the medical information system 30.

The learning unit 133 trains the learning model from correspondence relation between the first pathology images (and the browsing history information) acquired by the pathology image acquisition unit 131 and the diagnosis information acquired by the diagnosis information acquisition unit 132. As a result, the learning unit 133 generates the trained model 121 for obtaining an estimation result of diagnosis from a second pathology image. Then, the learning unit 133 stores the trained model 121 in the storage unit 120.

Note that, for example, weak supervised learning can be applied to the training of the learning model by the learning unit 133, and the following method can also be used.

"WILDCAT:Weakly Supervised Learning of Deep ConvNets for Image Classification, Pointwise Localization and Segmentation", CVPR 2017 (http://webia.lip6.fr/~durandt/pdfs/2017_CVPR/Durand_WILDCAT_CVPR_2017.pdf)

"Attention-based Deep Multiple Instance Learning", 2018 (https://arxiv.org/abs/1802.04712)

However, the training method of the learning model by the learning unit 133 may be based on any algorithm. For example, the learning unit 133 can generate the trained model 121 using various learning algorithms such as deep learning that is a machine learning method based on a multilayer neural network (deep neural network), support vector machine, clustering, and reinforcement learning.

Furthermore, the learning unit 133 may not perform training of the learning model using all the first pathology images. For example, the learning unit 133 may perform training of the learning model using only first pathology images of particular interest. For example, on the basis of browsing history information of each of the pathology images, the learning unit 133 may train the learning model using only first pathology images including regions that have been browsed for a predetermined time or more, may train the learning model using only first pathology images including regions that have been browsed at a predetermined magnification, or may perform learning using only first pathology images including the regions that have been browsed a predetermined number of times or more. Furthermore, for example, the learning unit 133 may train the learning model using only the regions that have been browsed for a predetermined time or more, may perform learning using only the regions that have been browsed at a predetermined magnification, or may train the learning model using only the regions that have been browsed a predetermined number of times or more. Furthermore, for example, the learning unit 133 may assume that the center regions of the first pathology images are regions of interest, cut out only the center regions of the first pathology images, and train the learning model.

The deriving unit 134 acquires a second pathology image from the display control device 23 and inputs the second pathology image to the trained model 121, thereby causing the trained model 121 to derive an estimation result of diagnosis based on the second pathology image, and outputs the estimation result derived thereby to a display control unit 23*b*.

In addition, the deriving unit 134 identifies one or more first pathology images that have been important in deriving the estimation result by the trained model 121 from a pathology image database 211, and outputs the identified first pathology images to the display control unit 23*b* as basis images. Furthermore, the deriving unit 134 identifies diagnosis information associated with the first pathology images identified as the basis images from a diagnosis information database 212, and outputs the identified diagnosis information to the display control unit 23*b*.

At that time, as described above, the deriving unit 134 may acquire a whole slide image of a group of tile images including the first pathology images identified as the basis images and browsing history information regarding the respective first pathology images constituting the whole slide image from the pathology image database 211 and the server 12, and output the acquired whole slide image and browsing histories to the display control unit 23*b*.

[1-4. Flow of Diagnosis Support Information Generation]

As described above, the diagnosis support system 1 according to the present embodiment provides diagnosis support information for supporting diagnosis to a user such as a pathologist or a doctor who performs diagnosis for a patient. The diagnosis support information may include an estimation result derived by the trained model on the basis of a second pathology image, a basis image that has been important in deriving the estimation result, and diagnosis information associated with the basis image.

Figure 11:
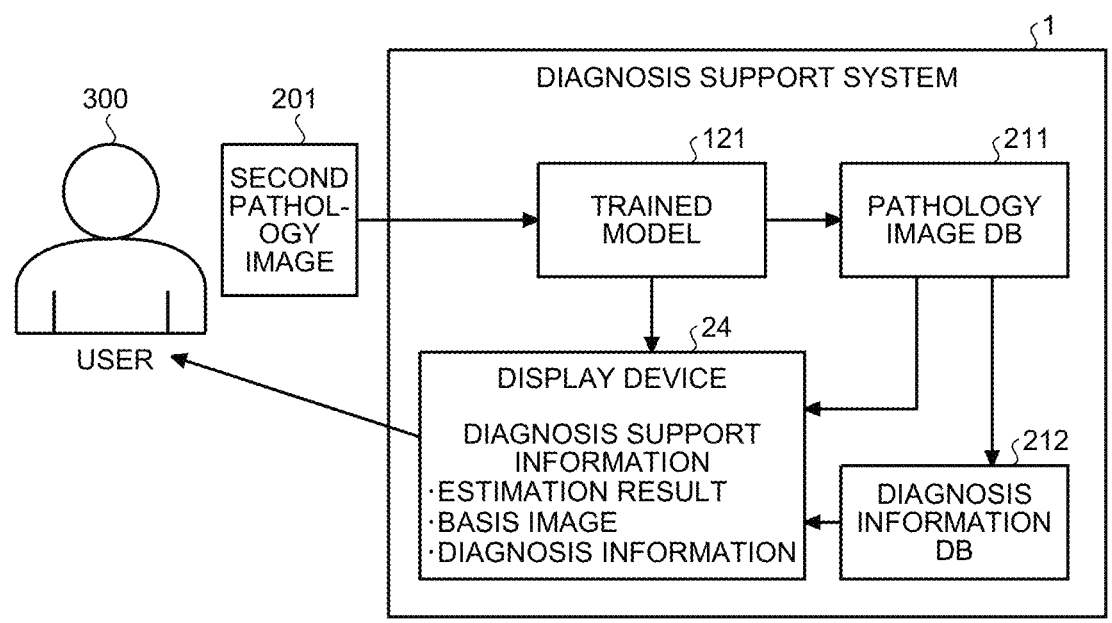
FIG. 11 is a schematic diagram illustrating a flow until diagnosis support information is provided by the diagnosis support system according to the one embodiment.

FIG. 11 is a schematic diagram illustrating a flow until diagnosis support information is provided by the diagnosis support system according to the present embodiment. As illustrated in FIG. 11, in the present embodiment, first, a user 300 such as a pathologist or a doctor operates the display control device 23 to input a second pathology image 201 of a diagnosis target acquired by an image acquisition unit 23*a* to the diagnosis support system 1. The second pathology image 201 input to the diagnosis support system 1 is input to the deriving unit 134 of the control unit 130. The deriving unit 134 reads the trained model 121 from the storage unit 120 and inputs the second pathology image 201 to the trained model 121 to derive an estimation result of diagnosis based on the second pathology image 201. The derived estimation result is input to the display control unit 23*b* of the display control device 23, and is presented to the user 300 by being displayed on the display device 24 as one piece of diagnosis support information.

Furthermore, the deriving unit 134 identifies, from the pathology image database 211, a first pathology image that has been important in deriving the estimation result on the basis of the second pathology image 201 by the trained model 121. Then, the deriving unit 134 inputs the identified first pathology image as a basis image to the display control unit 23*b* of the display control device 23. As a result, the basis images are displayed on the display device 24 as one piece of diagnosis support information and presented to the user 300. Note that the pathology image database 211 may be a storage device that saves first pathology images in the server 12 of the pathology system 10, or may be another storage device that accumulates the first pathology images collected from the storage device. In the former case, the pathology image database 211 may include a storage device that saves the second pathology image in the server 22 of the pathology system 20. In the latter case, the pathology image database 211 may accumulate the second pathology image collected from the storage device of the server 22.

Furthermore, the deriving unit 134 identifies diagnosis information associated with the first pathology image identified as the basis image from the diagnosis information database 212. Then, the deriving unit 134 inputs the identified diagnosis information to the display control unit 23*b* of the display control device 23. As a result, a diagnosis image is displayed on the display device 24 as one piece of diagnosis support information and presented to the user 300. Note that the diagnosis information database 212 may be, for example, a storage device that saves diagnosis information in the medical information system 30.

Note that, as described above, a whole slide image or browsing history information may be presented to the user 300. In this case, the deriving unit 134 identifies the whole slide image of a group of tile images including the basis image from the pathology image database 211 and inputs the whole slide image to the display control unit 23*b*, and acquires browsing histories of pathology images regarding the whole slide image from a browsing history information database (not illustrated) and inputs the browsing histories to the display control unit 23*b*.

[1-5. Identification Method For Basis Image]

Next, a method for identifying a basis image by the deriving unit 134 will be described with some examples.

[1-5-1. First Identification Method]

Figure 12:
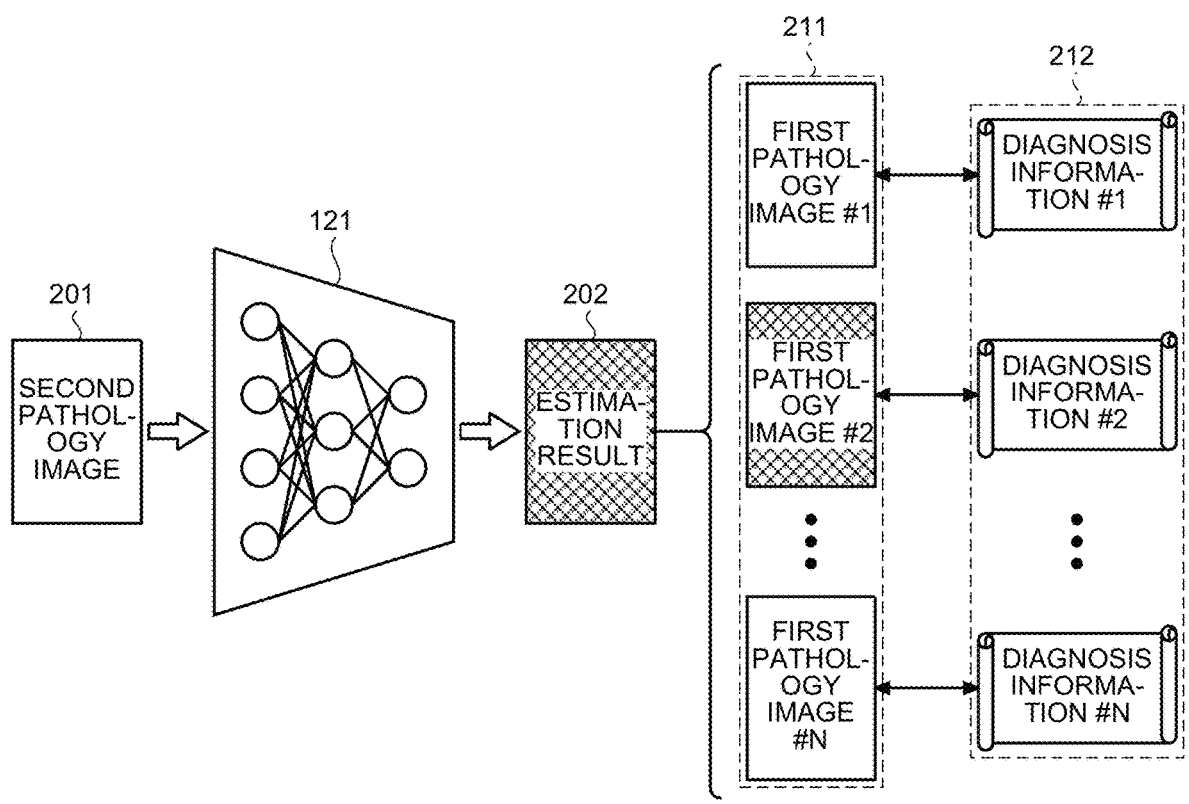
FIG. 12 is a schematic diagram for describing an identification method for a basis image according to the one embodiment.

FIG. 12 is a schematic diagram for describing an identification method for a basis image according to the present embodiment. As illustrated in FIG. 12, in the present embodiment, a second pathology image 201 of a diagnosis target is input to the trained model 121, and an estimation result 202 of diagnosis is output from the trained model 121. Then, a first pathology image that has been important in deriving the estimation result 202 is identified from the pathology image database 211, and the identified first pathology image is presented to a user together with the estimation result 202. In the example illustrated in FIG. 12, a first pathology image #2 is identified as a basis image and presented to the user together with the estimation result 202.

In addition, in the present embodiment, as illustrated in FIG. 12, diagnosis information #2 associated with the first pathology image #2 identified as the basis image is identified from the diagnosis information database 212, and the identified diagnosis information #2 is presented to the user together with the estimation result 202 and the first pathology image #2 (basis image).

The pathology image identified as the basis image is at least one of first pathology images used for training of the learning model. Therefore, the basis image can be identified by how each of the first pathology images has affected in deriving the estimation result by the trained model 121 being analyzed.

For example, Non Patent Literature "Understanding Black-box Predictions via Influence Functions" (Pang Wei Koh and Percy Liang, ICML2017) discloses a method of measuring importance in prediction (estimation) of a certain learning image by calculating how much prediction changes when the learning image is deleted from learning data.

Therefore, in the present embodiment, how much the estimation result changes when each of the first pathology images used as training data is deleted from the training data is calculated, and the importance in estimation of each of the first pathology images is measured on the basis of the change amount. Then, the basis image is identified on the basis of the importance obtained by the measuring. A plurality of first pathology images may be identified as basis images.

Note that, for example, a change amount of a score obtained by evaluating the estimation result may be used as the change amount of the estimation result. However, the present invention is not limited thereto, and various values can be used as long as the value is a change amount obtained by quantitatively evaluating the estimation result.

Furthermore, in identifying the basis image, one or more first pathology images diagnosed by an experienced diagnostician (a doctor, a pathologist, or the like) or the like may be preferentially selected. For example, on the basis of doctor IDs in diagnosis information associated with the respective first pathology images, information of diagnosticians who have diagnosed the respective first pathology images may be identified, and the priority of the respective diagnosticians may be determined from the information of the identified diagnosticians. Then, in a case where there is a plurality of first pathology images having the same degree of importance obtained by measuring, the priority of respective diagnosticians may be identified from diagnosis information associated with the first pathology images, and one or more first pathology images to be basis images may be selected from the first pathology images having the same degree of importance obtained by the measuring on the basis of the priority.

Alternatively, bias values (coefficients, offsets, or the like) may be set for the respective diagnostician instead of the priority, and one or more basis images may be selected after the importance obtained by measuring the respective first pathology images is increased or decreased by the bias values.

As described above, by information of a diagnostician being considered in identifying a basis image, the reliability of the basis image and diagnosis information to be presented to a user can be further improved.

[1-5-2. Second Identification Method]

Figure 13:
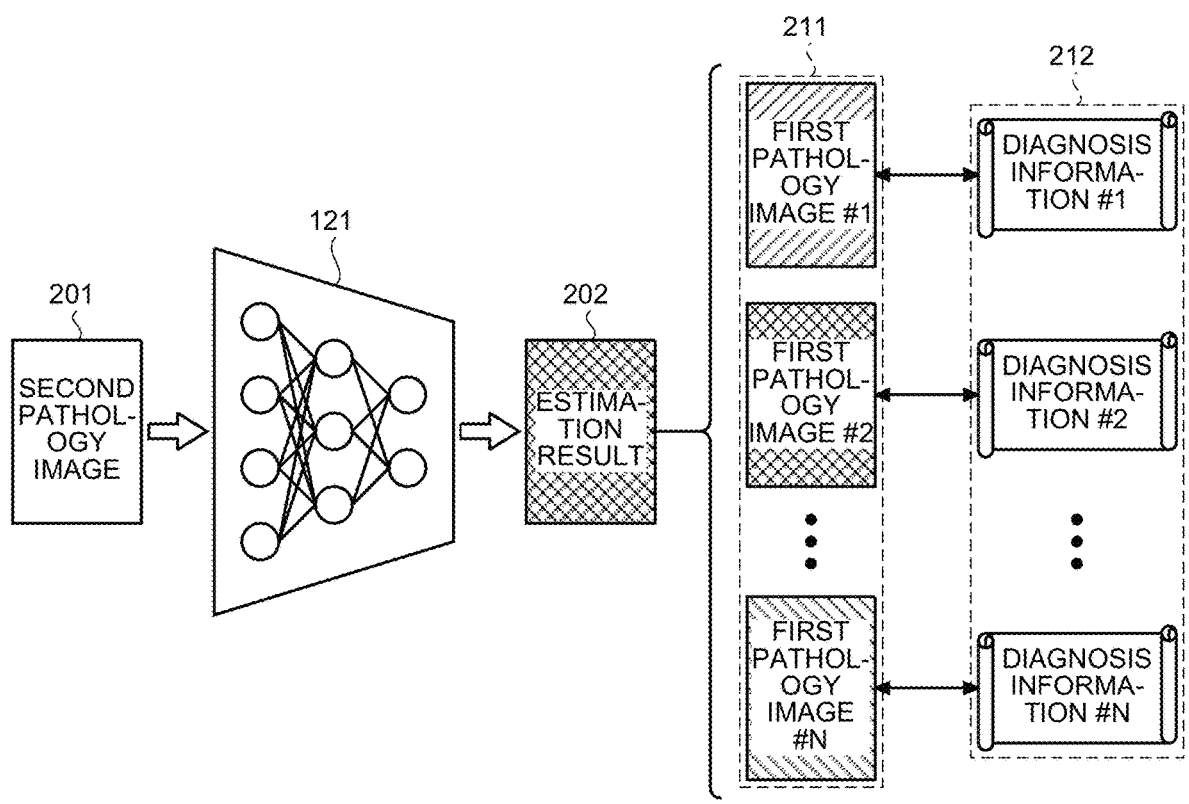
FIG. 13 is a schematic diagram for describing another identification method for basis images according to the one embodiment.
Figure 14:
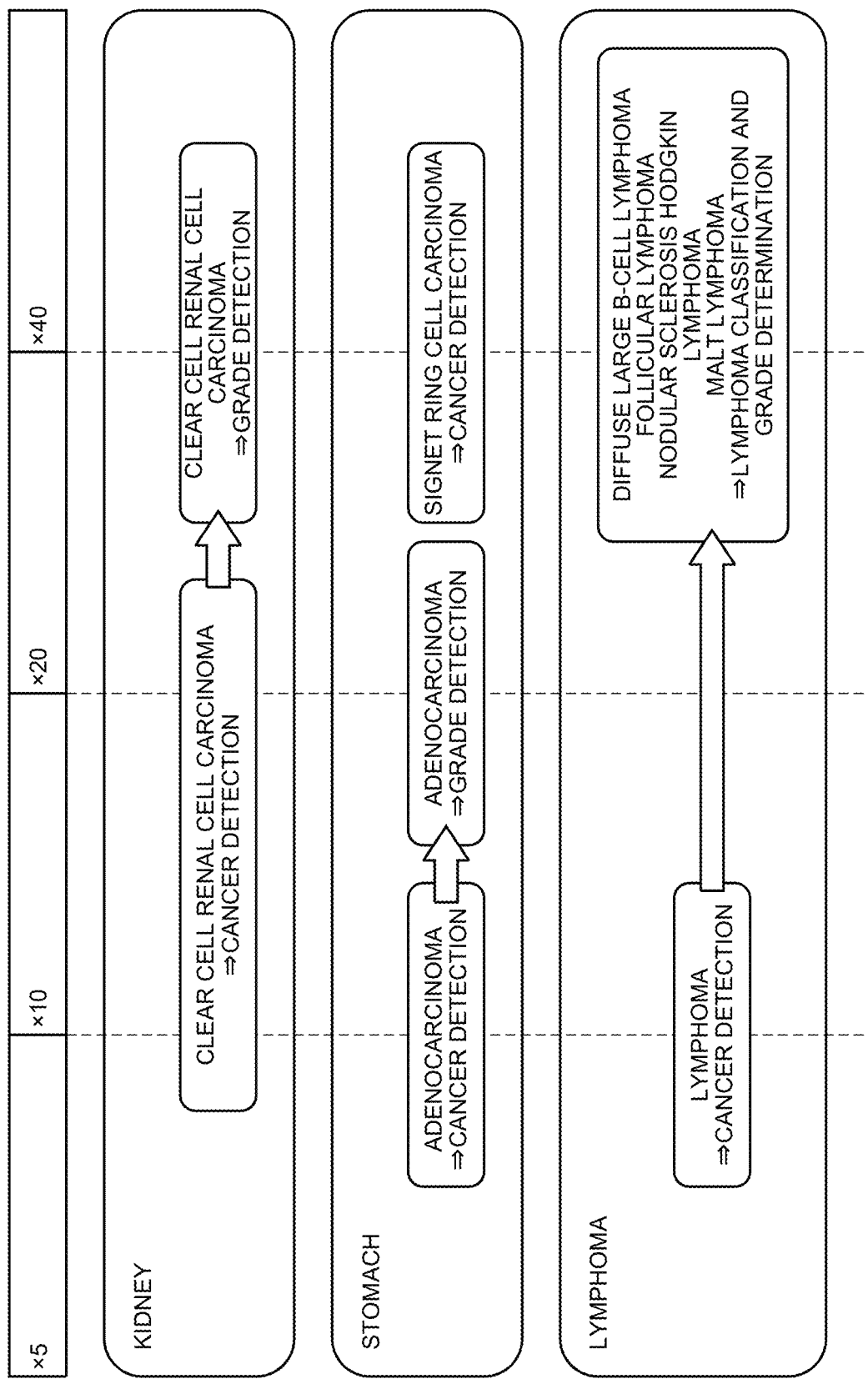
FIG. 14 is a diagram illustrating relation between the types of cases and the purposes of diagnosis, and magnifications of pathology images suitable for the types of cases and the purposes of diagnosis.

Furthermore, FIG. 13 is a schematic diagram for describing another identification method for basis images according to the present embodiment, and FIG. 14 is a diagram illustrating relation between the types of cases and the purposes of diagnosis, and the magnifications of pathology images suitable for the types of cases and the purposes of diagnosis.

As illustrated in FIG. 13, basis images can be identified in respective layers of the network of the trained model 121 and the identified basis images of the respective layers and the diagnosis information can be presented to a user. That is, in a case where the trained model 121 includes multiple layers like deep learning, the basis images that have been important in the respective layers can be identified and the identified basis images in the respective layers and the diagnosis information associated therewith can be presented to the user.

Here, in deep learning, it is known that features of interest change in the respective layers. For example, a first layer immediately after an input layer reacts to specific feature amounts such as edges and line segments, and changes so as to react to abstract feature amounts such as texture and color as the layer progresses. This is also considered to be correlated with the magnification of pathology images. That is, it is considered that higher layers (layers closer to the input layer) of the trained model 121 react to pathology images having a weak magnification (low resolution), and layers react to pathology images having a strong magnification (high resolution) as the layers get lower (layers closer to an output layer).

On the other hand, as illustrated in FIG. 14, in diagnosis based on a pathology image, there is an appropriate magnification of the pathology image according to the type of a case, the purpose of diagnosis, and the like. Therefore, layers for identifying a basis image are desired to be changed according to the type of a case, the purpose of diagnosis, and the like. For example, in the example illustrated in FIG. 14, the layers for identifying a basis image may be switched according to the type of a case, the purpose of diagnosis, and the like such that, in a case where the case is "clear cell renal cell carcinoma" of "Kidney" and the purpose of diagnosis is "cancer detection", the basis image is identified in a layer that reacts to the feature amount of a pathology image having a magnification of about five times to 20 times (relatively lower layer), and in a case where the case is "clear cell renal cell carcinoma" of "Kidney" and the purpose of diagnosis is "grade detection", a basis image is identified in a layer that reacts to the feature amount of a pathology image having a magnification of about 20 times to 40 times (relatively upper layer).

[1-5-3. Third Identification Method]

Figure 15:
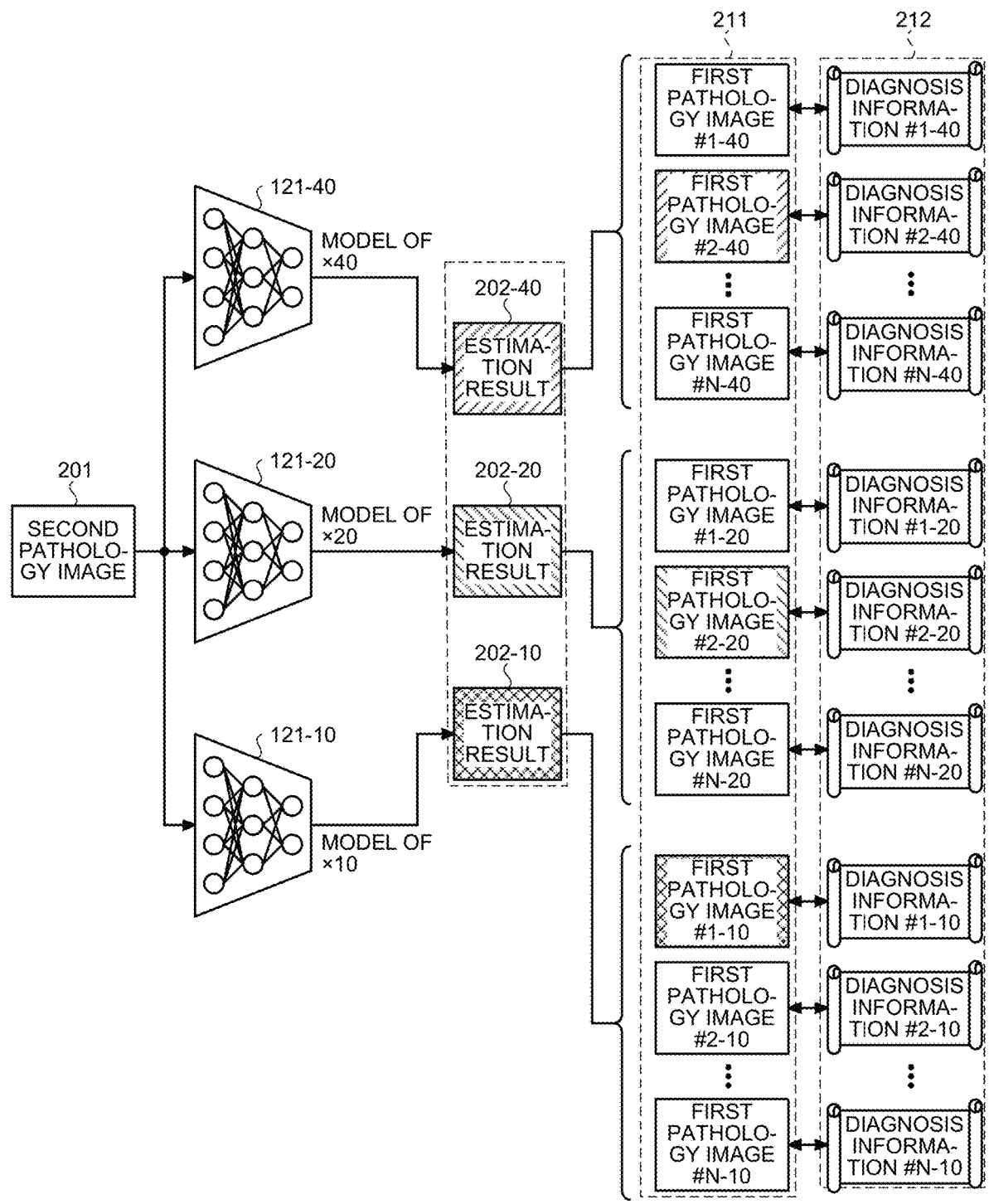
FIG. 15 is a schematic diagram for describing another identification method for basis images according to the one embodiment.

FIG. 15 is a schematic diagram for describing another identification method for basis images according to the present embodiment. As illustrated in FIG. 15, different trained models may be created for respective magnifications of a pathology image, and estimation results, basis images, and diagnosis information may be identified in the respective trained models.

In the example illustrated in FIG. 15, a trained model 121-10 that derives an estimation result 202-10 from a pathology image of 10 times, a trained model 121-20 that derives an estimation result 202-20 from the pathology image of 20 times, and a trained model 121-40 that derives an estimation result 202-40 from the pathology image of 40 times are prepared, and basis images that have been important in deriving respective estimation results 202-10, 202-20, and 202-40 and diagnosis information associated therewith are identified from the pathology image database 211 and the diagnosis information database 212.

Specifically, a first pathology image #1-10 of 10 times that has been important when the trained model 121-10 derives the estimation result 202-10 is identified from the pathology image database 211, a first pathology image #2-20 of 20 times that has been important when the trained model 121-20 derives the estimation result 202-20 is identified from the pathology image database 211, and a first pathology image #2-40 of 40 times that has been important when the trained model 121-40 derives the estimation result 202-40 is identified from the pathology image database 211. Then, diagnosis information #1-10, #2-20, and #2-40 respectively associated with identified first pathology images #1-10, #2-20, and #2-40 are identified from the diagnosis information database 212.

With such a configuration, a user can perform diagnosis on the basis of an estimation result derived by a trained model 121 for a suitable magnification according to the type of a case, the purpose of diagnosis, and the like, a basis image, and diagnosis information.

[1-5-4. Fourth Identification Method]

Figure 16:
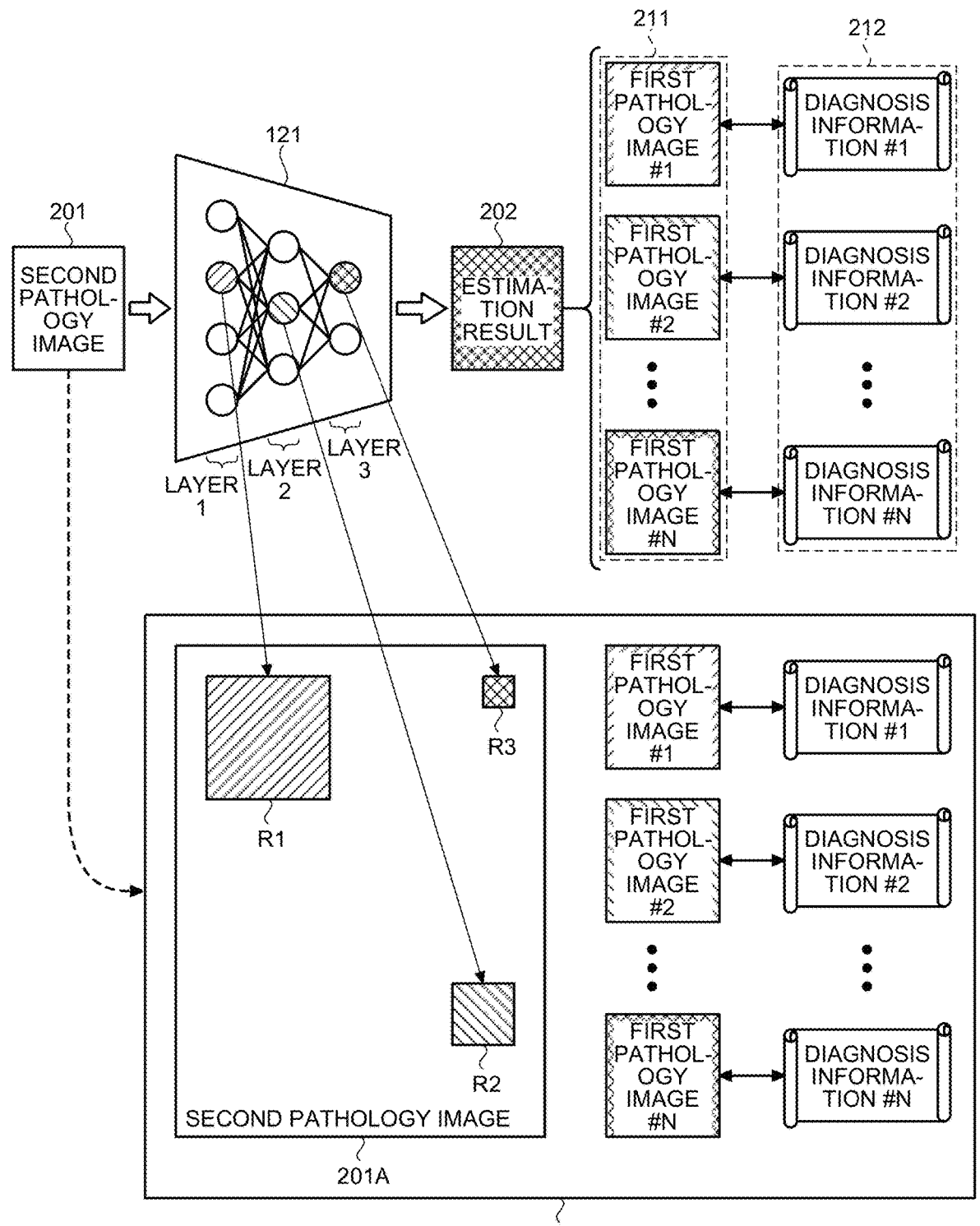
FIG. 16 is a schematic diagram for describing another identification method for basis images according to the one embodiment.

Furthermore, in order to identify basis images, for example, a method of visualizing the basis of estimation, such as Grad-CAM or Guided Grad-CAM can also be used. FIG. 16 is a schematic diagram for describing another identification method for basis images according to the present embodiment.

As illustrated in FIG. 16, in a case where a method of visualizing the basis of estimation such as Grad-CAM or Guided Grad-CAM is used, regions on the second pathology image 201 corresponding to neurons fired most in the respective layers of the trained model 121 can be identified from the neurons. Therefore, in the present embodiment, basis images that have been important in deriving the estimation result may be identified for the respective layers of the trained model 121, which regions in the second pathology image 201 have contributed to deriving the estimation result may be identified for the respective layer of the trained model 121, and the basis images and the regions may be presented to a user in association with each other.

In an example illustrated in FIG. 16, the trained model 121 includes three layers from a first layer to a third layer (provided that the input layer and the output layer are not included). In the first layer, the first pathology image #1 is identified as a basis image, and a neuron corresponding to a region R1 in the second pathology image 201 is most fired. In the second layer, the first pathology image #2 is identified as a basis image, and a neuron corresponding to a region R2 in the second pathology image 201 is most fired. In the third layer, a first pathology image #N is identified as a basis image, and a neuron corresponding to a region R3 in the second pathology image 201 is most fired. Therefore, the display device 24 that presents diagnosis support information to a user displays first pathology images #1, #2, and #N that have been important in the respective layers and diagnosis information #1, E2, and #N associated therewith, and an image 201A indicating the positions on the second pathology image 201 of regions R1, R2, and R3 corresponding to neurons most fired in the respective layers. The background of the image 201A indicating the positions of the regions R1, R2, and R3 may be, for example, the second pathology image 201.

[1-5-5. Other Identification Methods]

Note that a basis image that has been important in diagnosis can also be regarded as a similar image of the second pathology image that is an input image (image to be estimated). That is, in the present embodiment, instead of a first pathology image that has been important in machine learning, or together with the first pathology image that has been important in machine learning, a first pathology image similar to the second pathology image from a result of similar image search in the pathology image database 211 can also be regarded as a basis image. However, a method of using the first pathology image that has been important in machine learning as the basis image is considered to have more improved interpretability than a method of searching for a similar image according to the distance between feature amounts of color or texture, and thus is considered to be more useful for diagnosis.

Furthermore, in a case where there is another image obtained by differently staining different from the first pathology image (for example, an image obtained by immunostaining) and the image obtained by differently staining is associated with the first pathology image and accumulated in the pathology image database 211 or the like, the image obtained by differently staining associated with a basis image may be presented to a user together. As a result, information more effective for diagnosis can be provided to the user.

Furthermore, above-described methods of identifying a basis image may be appropriately combined.

[1-6. Display Control Device]

Next, the display control device 23 will be described. The display control device 23 implements a display control program for presenting diagnosis support information generated as described above to a doctor, a pathologist, or the like that is a user. However, the present invention is not limited thereto, and the display control program may be downloaded from a server or installed from a storage medium such as a digital versatile disc (DVD) to a general-purpose computer to implement operation of the display control device 23 described below. Furthermore, the operation of the display control device 23 described below may be implemented by processing being performed by two or more devices, for example, by some processing being performed on a server and other processing being performed by a client computer such as the display control device 23. Furthermore, the operation of the display control device 23 described below may be implemented by the display control program operating on a cloud.

[1-6-1. Example of Diagnosis Support UI Screen]

As illustrated in FIG. 10, the display control device 23 includes the image acquisition unit 23a and the display control unit 23b, and implements or performs a function and an action of information processing described below. Note that the internal configuration of the display control device 23 is not limited to the configuration illustrated in FIG. 10, and may be another configuration as long as the information processing to be described below is performed. Furthermore, the image acquisition unit 23a and the display control unit 23b are implemented by, for example, a CPU or an MPU performing the display control program stored inside the display control device 23 using a RAM or the like as a work area. Furthermore, the image acquisition unit 23a and the display control unit 23b may be performed by, for example, an integrated circuit such as an ASIC or an FPGA.

The image acquisition unit 23a acquires a second pathology image from the server 22, and transmits the acquired second pathology image to the deriving device 100. For example, the image acquisition unit 23a transmits the second pathology image to be diagnosed by a pathologist to the deriving device 100 according to operation by the pathologist. Note that the image acquisition unit 23a and the display control unit 23b may be the same, and the processing of transmitting the second pathology image to the deriving device 100 may be performed by the display control unit 23b.

The display control unit 23b receives diagnosis support information output from the trained model 121 using the second pathology image as input from the deriving device 100. Then, the display control unit 23b controls the display device 24 such that the display device 24 displays the received diagnosis support information to a user. Note that, in the following description, displaying various types of information such as diagnosis support information on the display device 24 by the display control unit 23b controlling the display device 24 may be simply referred to as displaying various types of information by the display control unit 23b.

Figure 17:
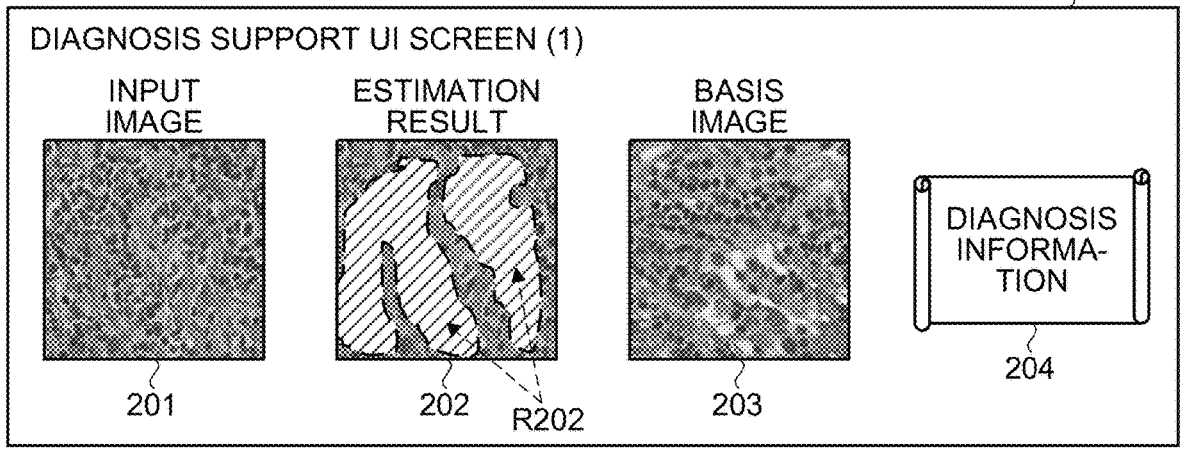
FIG. 17 is a diagram illustrating an example of a diagnosis support UI screen (1) according to the one embodiment.
Figure 18:
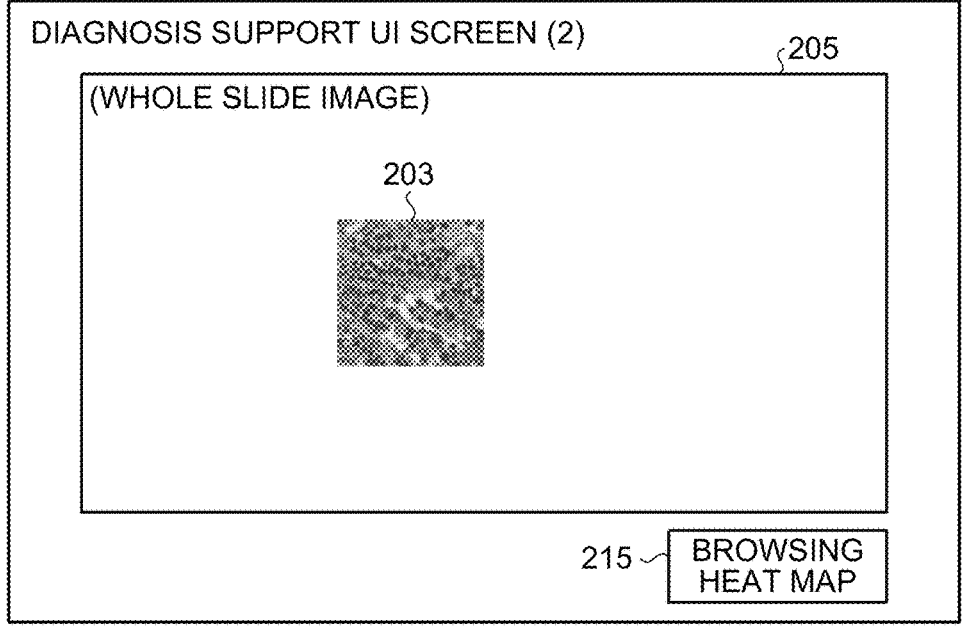
FIG. 18 is a diagram illustrating an example of a diagnosis support UI screen (2) according to the one embodiment.
Figure 19:
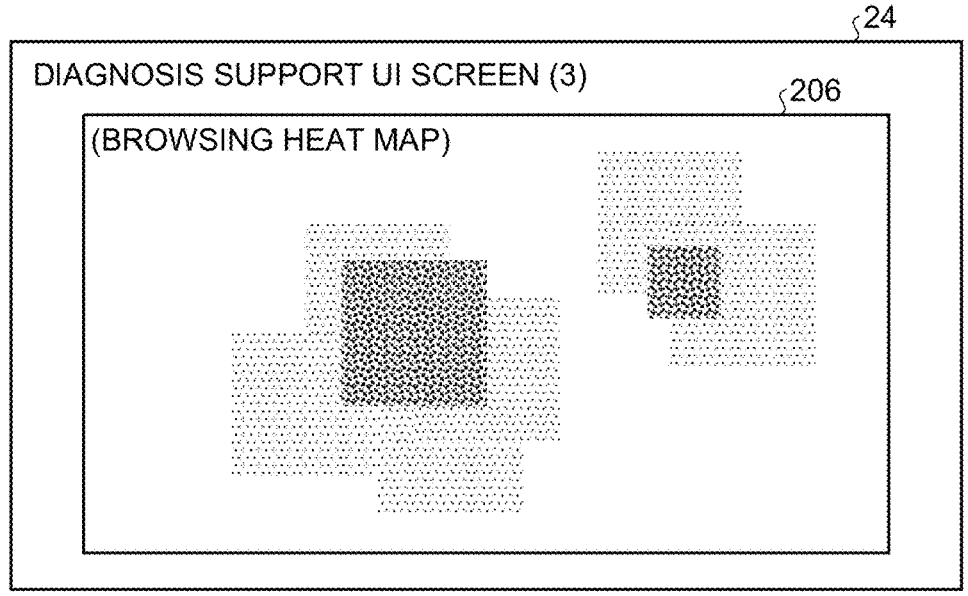
FIG. 19 is a diagram illustrating an example of a diagnosis support UI screen (3) according to the one embodiment.

FIG. 17 is a diagram illustrating an example of a diagnosis support user interface (UI) screen (1) according to the present embodiment. FIG. 18 is a diagram illustrating an example of a diagnosis support UI screen (2) according to the present embodiment, and FIG. 19 is a diagram illustrating an example of a diagnosis support UI screen (3) according to the present embodiment. Note that the diagnosis support UI screen (2) is a display screen of a whole slide image of a group of tile images including a basis image, and the diagnosis support UI screen (3) is a display screen of a heat map of a browsing history (also referred to as a browsing heat map). Diagnosis support UI screens (1) to (3) illustrated in FIGS. 17 to 19 are generated by the display control device 23 and displayed on the display device 24, for example.

FIG. 17 illustrates an example of the diagnosis support UI screen (1) that presents the input image 201, the estimation result 202, a basis image 203, and diagnosis information 204 side by side to a user. Since the input image is the second pathology image 201 that is a diagnosis target, the same reference numeral '201' is used here. Note that, in the present embodiment, as illustrated in FIG. 17, the estimation result 202 is displayed as an image based on the second pathology image 201. Hatched regions R202 in the image of the estimation result 202 may be, for example, regions estimated as cancer cells in the second pathology image 201.

Furthermore, when the user selects the basis image 203 by clicking or the like on the diagnosis support UI screen (1), for example, as illustrated in FIG. 18, the diagnosis support UI screen (2) for presenting a whole slide image 205 of a group of tile images including a first pathology image selected as the basis image 203 to the user may be displayed on the display device 24.

Furthermore, for example, when the user selects a "browsing heat map" button 215 displayed on the diagnosis support UI screen (2) by clicking or the like, as illustrated in FIG. 19, the display device 24 may display a browsing heat map 206 generated on the basis of browsing history information of the image group of the first pathology image identified as the basis image 203.

[1-6-2. Modification of Diagnosis Support UI screen]

Figure 20:
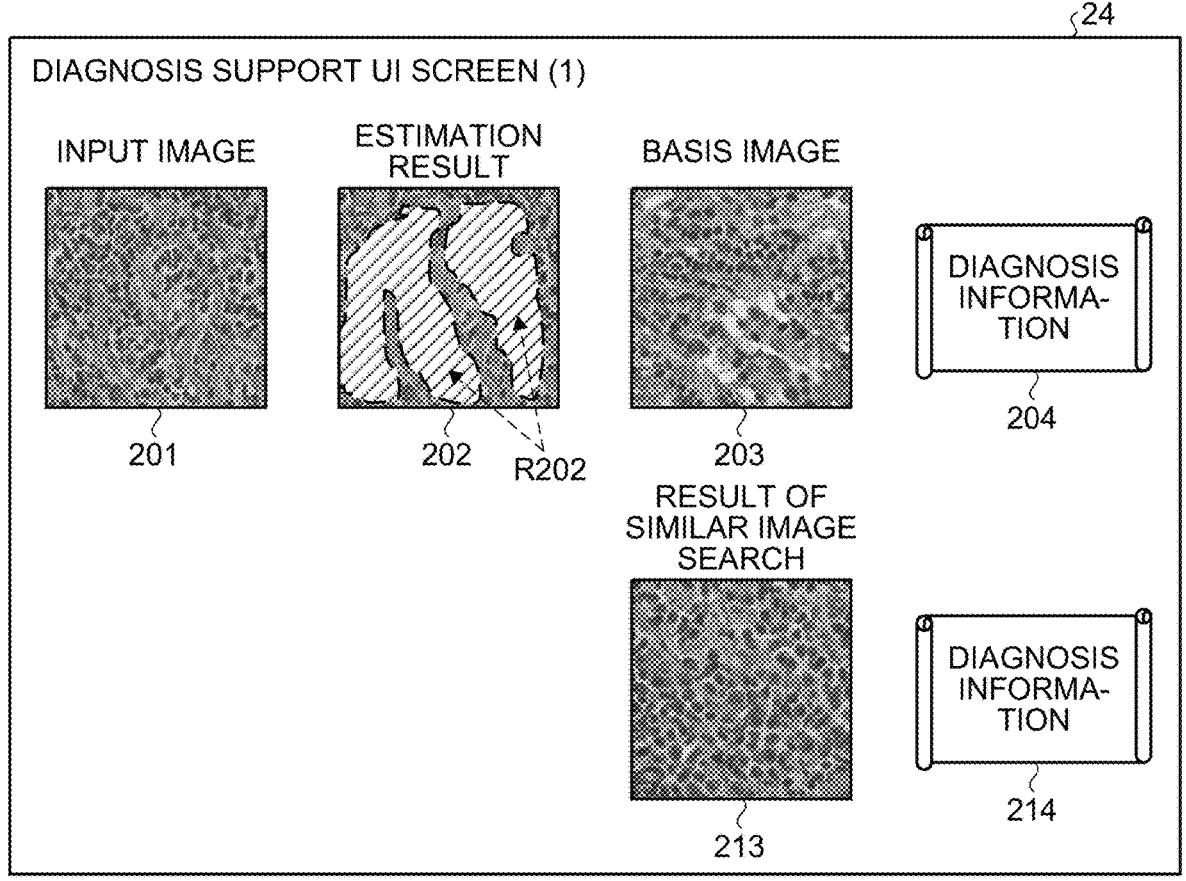
FIG. 20 is a diagram illustrating a modification of the diagnosis support UI screen (1) according to the one embodiment.

Furthermore, as described in "1-5-5. Other identification methods" above, in a case where a first pathology image similar to the second pathology image that is the input image 201 is identified from the pathology image database 211 by similar image search, as illustrated in FIG. 20, together with the first pathology image (basis image 203) identified as being important in machine learning and the diagnosis information 204 associated therewith, a first pathology image 213 identified as a pathology image similar to the input image 201 from a result of similar image search for the pathology image database 211 and diagnosis information 214 associated therewith may be displayed on the diagnosis support UI screen (1) as a basis image and the diagnosis information. Note that, as described above, instead of the first pathology image identified as being important in machine learning and the diagnosis information, the first pathology image identified by the similar image search and the diagnosis information may be displayed on the diagnosis support UI screen (1) as the basis image 203 and the diagnosis information 204.

Furthermore, an evaluation result (also referred to as a score) obtained by evaluating the reliability (also referred to as an accuracy rate) of an estimation result derived by the trained model 121 may be displayed on the diagnosis support UI screen (1).

[1-7. Processing Procedure]

Next, a processing procedure according to the present embodiment will be described in detail with reference to the drawings.

[1-7-1. Learning Processing Procedure]

Figure 21:
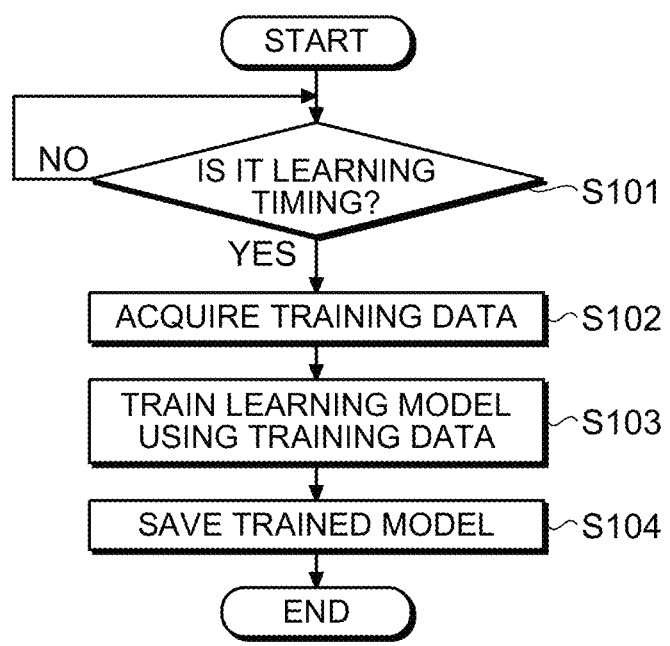
FIG. 21 is a flowchart illustrating a learning processing procedure according to the one embodiment.

FIG. 21 is a flowchart illustrating a learning processing procedure according to the present embodiment. As illustrated in FIG. 21, in the present operation, the deriving device 100 first determines whether it is learning timing (step S101), and when it is not learning timing (step S101; NO), the deriving device 100 stands by for the present operation. For example, in a case where a learning date and time at which learning is performed is determined in advance, the deriving device 100 determines whether the current date and time is the learning date and time.

When it is learning timing (step S101; Yes), the deriving device 100 acquires first pathology images and diagnosis information from the pathology image database 211 and the diagnosis information database 212 as training data (step S102). At that time, the deriving device 100 may acquire browsing history information from the server 12 as a part of the training data.

Subsequently, the deriving device 100 trains the learning model in the storage unit 120 using the first pathology images and the diagnosis information as the training data (step S103). Then, the deriving device 100 saves the trained model 121 generated by the training in the storage unit 120 (step S104), and ends the present operation. As a result, the trained model 121 for deriving an estimation result of diagnosis from a pathology image is disposed in the storage unit 120.

Note that, although FIG. 21 illustrates an example in which the trained model 121 is newly generated, the deriving device 100 can also re-train the trained model 121. In this case, new pathology images may be used for re-training of the trained model 121.

[1-7-2. Deriving Processing Procedure]

Figure 22:
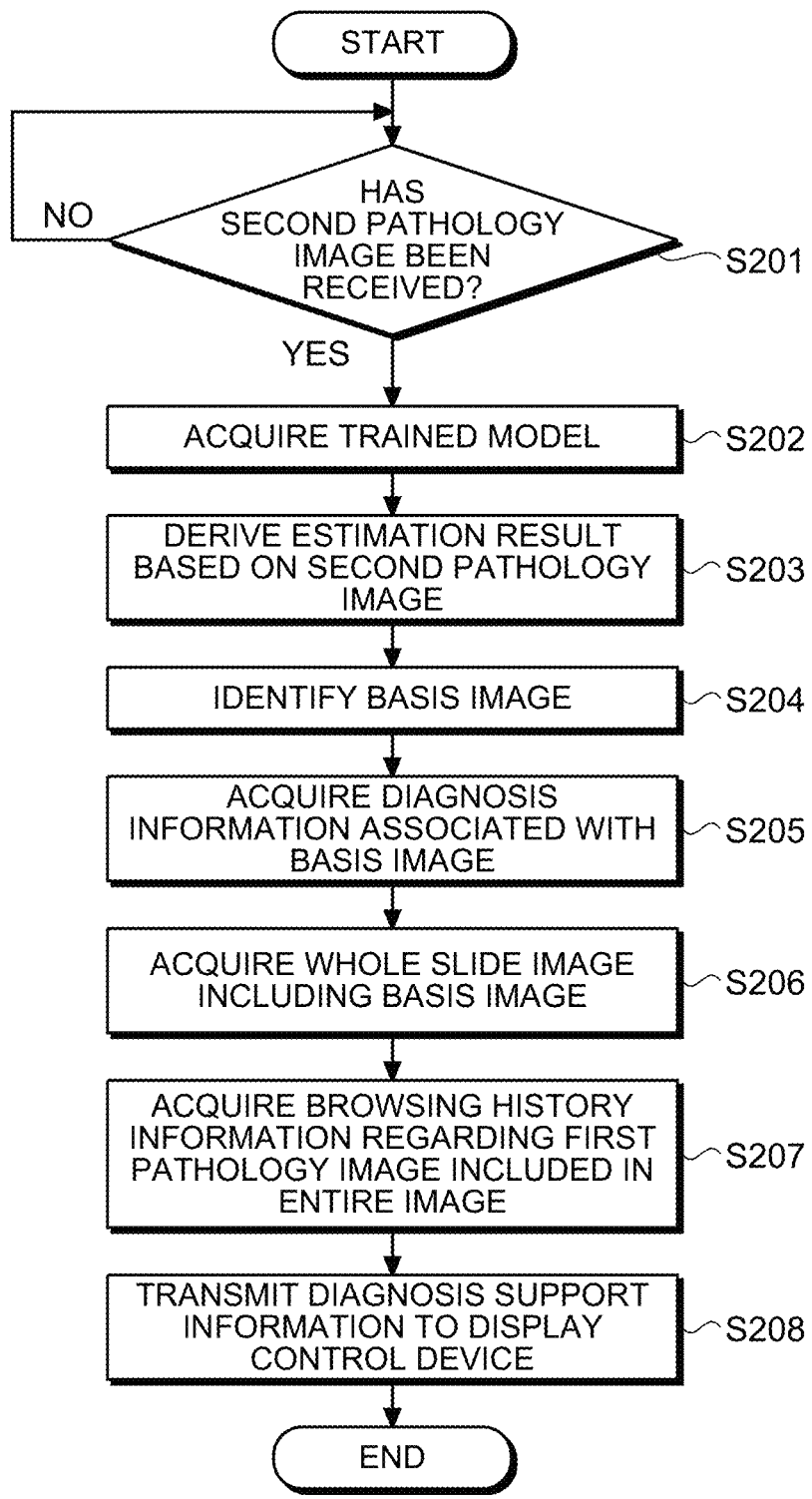
FIG. 22 is a flowchart illustrating a deriving processing procedure according to the one embodiment.

FIG. 22 is a flowchart illustrating a deriving processing procedure according to the present embodiment. As illustrated in FIG. 22, in the present operation, the deriving device 100 first determines whether a second pathology image has been received from the display control device 23 (step S201).

Next, the deriving device 100 acquires the trained model 121 from the storage unit 120 (step S202). Subsequently, the deriving device 100 derives an estimation result of diagnosis for the second pathology image by inputting the second pathology image received in step S201 to the trained model 121 (step S203).

Next, the deriving device 100 identifies, as a basis image, a first pathology image that has been important in deriving the estimation result by the trained model 121 (step S204). The method described in "1-5. Identification method for basis image" may be used to identify the basis image.

Next, the deriving device 100 acquires, from the diagnosis information database 212, diagnosis information associated with the first pathology image identified as the basis image in step S204 (step S205).

Furthermore, the deriving device 100 acquires a whole slide image of a group of tile images including the first pathology image identified as the basis image in step S204 from the pathology image database 211 (step S206), and acquires browsing history information regarding the group of tile images of the whole slide image from the server 12 (step S207).

Next, the deriving device 100 inputs the estimation result, the basis image, the diagnosis information, the whole slide image, and the browsing history information acquired as described above to the display control unit 23b of the display control device 23 (step S208), and ends the present operation. On the other hand, the display control unit 23b generates the diagnosis support UI screens (1) to (3) as illustrated in FIGS. 17 to 20 and inputs the screens to the display device 24. As a result, the display device 24 displays the diagnosis support UI screens (1) to (3) as illustrated in FIGS. 17 to 20.

[1-8. Action and Effect]

As described above, according to the present embodiment, when an estimation result of diagnosis derived by the trained model 121 trained using pathology images acquired in the past cases is presented to a user, a pathology image that serves as a basis for derivation of the estimation result can also be presented to the user, and accordingly, the user can determine what kind of pathology image the estimation result is derived from. As a result, the user can determine the reliability of the estimation result on the basis of the basis image, and thus more accurate diagnosis can be performed on a case.

Furthermore, according to the present embodiment, the diagnosis information associated with a basis image can be presented to the user together with the estimation result and the basis image, and accordingly, the user can perform more accurate diagnosis with reference to a past case.

Furthermore, according to the present embodiment, since a whole slide image of a group of tile images including the basis image and browsing histories of the group of pathology images are presented to the user, information that enables the user to perform accurate diagnosis can be provided.

(2. Other Embodiments)

The processing according to the above-described embodiment may be performed in various different forms other than the above-described configuration.

[2-1. Display Device]

In the above embodiment, an example has been described in which the diagnosis support UI screens (1) to (3) are displayed on the stationary type display device 24. However, diagnosis support information may be displayed on a wearable device worn by a viewer browsing a pathology image displayed on the display device 24 (a head mounted display or the like). At that time, diagnosis support information may be superimposed on the pathology image displayed on the display device 24. Furthermore, the diagnosis support information may be displayed on a transparent display attached so as to cover the front surface of the display device 24. At that time, the diagnosis support information may be displayed on the transparent display such that the diagnosis support information is superimposed on the pathology image displayed on the display device 24.

[2-2. Imaging Device]

Furthermore, in the above embodiment, a microscope has been described as an example of a device for imaging a specimen, but the present invention is not limited thereto. For example, the device for imaging a specimen may be a medical image acquisition device such as an endoscope for imaging the inside of a patient's body, computed tomography (CT), or magnetic resonance imaging (MRI). In this case, the server 12 and the server 22 save medical images such as two-dimensional still images or moving images generated by an endoscope and three-dimensional images generated by CT or MRI. Furthermore, the server 12 and the server 22 may store information regarding the images such as imaging conditions and diagnosis results for the images in association with these images.

[2-3. Server]

Furthermore, the server 12 and the server 22 may store other pathology images obtained by imaging by another medical image acquisition device such as an endoscope, CT, or MRI in association with pathology images generated by the microscope. In this case, in addition to the pathology images generated by the microscope, the display control unit 23b may display another pathology image obtained by imaging by another imaging device side by side for reference.

[2-4. Pathology Image]

Among the pathology images saved in the server 12 and the server 22, there are also pathology images having low resolution. That is, there is a case where the pathology images used as training data do not have resolution high enough for appropriately training a learning model. Here, in a case where a glass slide on which a specimen is placed is saved, the glass slide may be re-imaged using a high-resolution microscope to newly generate high-resolution pathology images. Therefore, in a case where the resolution of first pathology images used as training data is not high enough for appropriately training the learning model and there are pathology images obtained by re-imaging, the deriving device 100 may train the learning model using the pathology images obtained by re-imaging as training data.

[2-5. Hardware Configuration]

Figure 23:
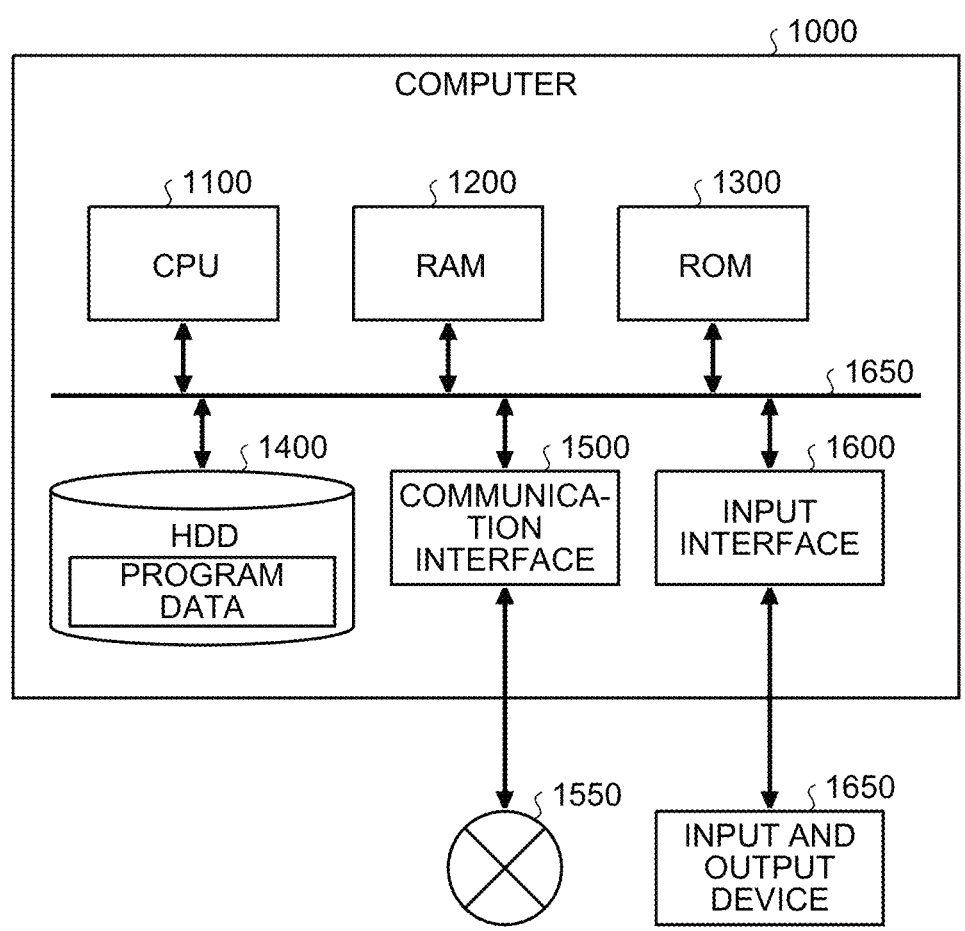
FIG. 23 is a hardware configuration diagram illustrating an example of a computer that implements functions of the deriving device.

Information devices such as the deriving devices 100 and 200 and the display control device 23 according to the above-described embodiments are implemented by a computer 1000 having a configuration as illustrated in FIG. 23, for example. Hereinafter, the deriving device 100 according to the above embodiment will be described as an example. FIG. 23 is a hardware configuration diagram illustrating an example of the computer 1000 that implements functions of the deriving device 100. The computer 1000 includes a CPU 1100, a RAM 1200, a read only memory (ROM) 1300, a hard disk drive (HDD) 1400, a communication interface 1500, and an input and output interface 1600. Each unit of the computer 1000 is connected by a bus 1050.

The CPU 1100 operates on the basis of programs stored in the ROM 1300 or the HDD 1400, and controls each unit. For example, the CPU 1100 deploys programs stored in the ROM 1300 or the HDD 1400 in the RAM 1200, and performs processing corresponding to various programs.

The ROM 1300 stores a boot program such as a basic input output system (BIOS) performed by the CPU 1100 when the computer 1000 is activated, a program depending on the hardware of the computer 1000, and the like.

The HDD 1400 is a computer-readable recording medium in which a program performed by the CPU 1100, data used by the program, and the like are non-transiently recorded. Specifically, the HDD 1400 is a recording medium in which a response generation program according to the present disclosure that is an example of program data 1450 is recorded.

The communication interface 1500 is an interface for connecting the computer 1000 to an external network 1550 (for example, the Internet). For example, the CPU 1100 receives data from another device or transmits data generated by the CPU 1100 to another device via the communication interface 1500.

The input and output interface 1600 is an interface for connecting an input and output device 1650 and the computer 1000. For example, the CPU 1100 receives data from an input device such as a keyboard and a mouse via the input and output interface 1600. Furthermore, the CPU 1100 transmits data to an output device such as a display, a speaker, or a printer via the input and output interface 1600. Furthermore, the input and output interface 1600 may function as a media interface that reads a program or the like recorded in a predetermined computer-readable recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the deriving device 100 according to the above embodiments, the CPU 1100 of the computer 1000 performs the diagnosis support program loaded on the RAM 1200 to implement functions of the pathology image acquisition unit 131, the diagnosis information acquisition unit 132, the learning unit 133, the deriving unit 134, and the like. Furthermore, the HDD 1400 stores the diagnosis support program according to the present disclosure and data in the storage unit 120. Furthermore, for example, in a case where the computer 1000 functions as the display control device 23 according to the above embodiments, the CPU 1100 of the computer 1000 performs the display control program loaded on the RAM 1200 to implement functions of the image acquisition unit 23a, the display control unit 23b, and the like. Furthermore, the HDD 1400 stores the display control program according to the present disclosure. Note that the CPU 1100 reads the program data 1450 from the HDD 1400 and performs the program data 1450, but as another example, the diagnosis support program and the display control program may be acquired from another device via the external network 1550.

[Others]

Among the processing described in the above embodiments, all or a part of the processing described as being automatically performed can be manually performed, or all or a part of the processing described as being manually performed can be automatically performed by a known method. Furthermore, the processing procedure, specific name, and information including various types of data and parameters illustrated in the above document and the drawings can be freely changed unless otherwise specified. For example, the various types of information illustrated in each of the drawings are not limited to the illustrated information.

Furthermore, components of devices illustrated in the drawings are functionally conceptual, and are not necessarily physically configured as illustrated in the drawings. That is, a specific form of distribution and integration of each of the devices is not limited to the illustrated form, and all or a part thereof can be functionally or physically distributed and integrated in any unit according to various loads, usage conditions, and the like.

Furthermore, the above-described embodiments and modifications can be appropriately combined within a range in which processing contents do not contradict.

Note that the effects described in the present specification are merely examples and the present invention is not limited thereto, and other effects may be provided.

Note that the present technology can also have the following configurations.

(1)
An information processing apparatus comprising:
a deriving unit that derives an estimation result of diagnosis for a second pathology image using a trained model on which learning has performed using training data including a plurality of first pathology images; and
an identifying unit that identifies a basis image that serves as a basis for derivation of the estimation result by the trained model from the plurality of first pathology images.

(2)
The information processing apparatus according to (1),
wherein the identifying unit further identifies diagnosis information associated with a first pathology image identified as the basis image.

(3)
The information processing apparatus according to (1) or (2),
wherein the trained model comprises a plurality of layers, and
the deriving unit identifies the basis image that serves as a basis for derivation of the estimation result from the plurality of first pathology images in each of the plurality of layers.

(4)
The information processing apparatus according to any one of (1) to (3),
wherein the plurality of first pathology images comprises a plurality of first pathology images acquired by imaging a same specimen prepared from a biological sample at different magnifications,
the deriving unit derives the estimation result for each of the magnifications using each of trained models prepared for the respective magnifications of the first pathology image, and
the identifying unit identifies the basis image that serves as a basis for derivation of the estimation result by each of the trained models for the respective magnifications from the plurality of first pathology images.

(5)
The information processing apparatus according to any one of (1) to (4),
wherein the trained model comprises a plurality of layers, and
the identifying unit identifies a region on the second pathology image corresponding to a neuron fired most in each of the plurality of layers.

(6)
The information processing apparatus according to (2),
wherein the identifying unit identifies one or more first pathology images as the basis image from the plurality of first pathology images and identifies the diagnosis information of each of the one or more first pathology images.

(7)
The information processing apparatus according to (6),
wherein the diagnosis information comprises information regarding a diagnostician who has diagnosed a first pathology image associated with the diagnosis information, and
the identifying unit selects one or a plurality of first pathology images from the one or more first pathology images on a basis of the information regarding the diagnostician.

(8)
The information processing apparatus according to any one of (1) to (7),
  wherein the first and second pathology images are image data acquired by imaging a specimen prepared from a biological sample.
(9)
The information processing apparatus according to (8),
  wherein the plurality of first pathology images comprises an image group including a plurality of first pathology images acquired by imaging the same specimen at different magnifications.
(10)
The information processing apparatus according to (9),
  wherein the plurality of first pathology images comprises a whole slide image including an entire image of the specimen, and
  the identifying unit acquires the whole slide image included in the same image group as the first pathology image identified as the basis image from the plurality of first pathology images.
(11)
The information processing apparatus according to (10) further comprising a storage unit that stores past browsing histories of the plurality of respective first pathology images,
  wherein the identifying unit acquires browsing histories of respective first pathology images included in the image group including the acquired whole slide image.
(12)
The information processing apparatus according to any one of (1) to (11) further comprising
  a display control unit that causes a display device to display the estimation result derived by the deriving unit and the basis image identified by the identifying unit.
(13)
An information processing method comprising:
  deriving an estimation result of diagnosis for a second pathology image using a trained model on which learning has performed using training data including a plurality of first pathology images; and
  identifying a basis image that serves as a basis for derivation of the estimation result by the trained model from the plurality of first pathology images.
(14)
An information processing system comprising:
  an information processing apparatus that derives, from a pathology image acquired by imaging a specimen prepared from a biological sample, an estimation result of diagnosis for the pathology image; and
  a program that causes the information processing apparatus to perform:
  deriving an estimation result of diagnosis for a second pathology image using a trained model on which learning has been performed using training data including a plurality of first pathology images; and
  identifying a basis image that serves as a basis for derivation of the estimation result by the trained model from the plurality of first pathology images.

REFERENCE SIGNS LIST

1 DIAGNOSIS SUPPORT SYSTEM
10, 20 PATHOLOGY SYSTEM
11, 21 MICROSCOPE
12, 22 SERVER
13, 23 DISPLAY CONTROL DEVICE
14, 24 DISPLAY DEVICE
23a IMAGE ACQUISITION UNIT
23b DISPLAY CONTROL UNIT
30 MEDICAL INFORMATION SYSTEM
100 DERIVING DEVICE
110 COMMUNICATION UNIT
120 STORAGE UNIT
121, 121-10, 121-20, 121-40 TRAINED MODEL
130 CONTROL UNIT
131 PATHOLOGY IMAGE ACQUISITION UNIT
132 DIAGNOSIS INFORMATION ACQUISITION UNIT
133 LEARNING UNIT
134 DERIVING UNIT
201 SECOND PATHOLOGY IMAGE
201A IMAGE
202, 202-10, 202-20, 202-40 ESTIMATION RESULT
203 BASIS IMAGE
204, 214 DIAGNOSIS INFORMATION
211 PATHOLOGY IMAGE DATABASE
212 DIAGNOSIS INFORMATION DATABASE
213 FIRST PATHOLOGY IMAGE

The invention claimed is:

1. An information processing apparatus comprising:
  circuitry configured to:
  derive an estimation result of diagnosis for a second pathology image using a trained model on which learning has performed using training data including a plurality of first pathology images; and
  identify a basis image that serves as a basis for derivation of the estimation result by the trained model from the plurality of first pathology images, wherein identifying the basis image includes:
    calculating, for each of the plurality of first pathology images, a change amount in the estimation result that occurs when a respective first pathology image is excluded from the training data, and
    identifying the basis image based on the calculated change amount; and
  wherein the plurality of first pathology images are each associated with diagnosis information comprising information regarding a diagnostician who has diagnosed the respective first pathology image, and wherein the circuitry is further configured to select the basis image from the plurality of first pathology images based on the information regarding the diagnostician.

2. The information processing apparatus according to claim 1,
  wherein the circuitry is further configured to identify diagnosis information associated with a first pathology image identified as the basis image.

3. The information processing apparatus according to claim 2,
  wherein the circuitry is further configured to identify one or more first pathology images as the basis image from the plurality of first pathology images and identifies the diagnosis information of each of the one or more first pathology images.

4. The information processing apparatus according to claim 1,
  wherein the trained model comprises a plurality of layers, and
  the circuitry is further configured to identify the basis image that serves as a basis for derivation of the estimation result from the plurality of first pathology images in each of the plurality of layers.

5. The information processing apparatus according to claim 1,
- wherein the plurality of first pathology images comprises a plurality of first pathology images acquired by imaging a same specimen prepared from a biological sample at different magnifications,
- the circuitry is further configured to derive the estimation result for each of the magnifications using each of trained models prepared for the respective magnifications of the first pathology image, and
- the circuitry is further configured to identify the basis image that serves as a basis for derivation of the estimation result by each of the trained models for the respective magnifications from the plurality of first pathology images.

6. The information processing apparatus according to claim 1,
- wherein the trained model comprises a plurality of layers, and
- the circuitry is further configured to identify a region on the second pathology image corresponding to a neuron fired most in each of the plurality of layers.

7. The information processing apparatus according to claim 1,
- wherein the first and second pathology images are image data acquired by imaging a specimen prepared from a biological sample.

8. The information processing apparatus according to claim 7,
- wherein the plurality of first pathology images comprises an image group including a plurality of first pathology images acquired by imaging the same specimen at different magnifications.

9. The information processing apparatus according to claim 8,
- wherein the plurality of first pathology images comprises a whole slide image including an entire image of the specimen, and
- the circuitry is further configured to acquire the whole slide image included in the same image group as the first pathology image identified as the basis image from the plurality of first pathology images.

10. The information processing apparatus according to claim 9 further comprising a memory configured to store past browsing histories of the plurality of respective first pathology images,
- wherein the circuitry is further configured to acquire browsing histories of respective first pathology images included in the image group including the acquired whole slide image.

11. The information processing apparatus according to claim 1, wherein
- the circuitry is further configured to cause a display to display the estimation result and the basis image.

12. The information processing apparatus according to claim 11, wherein the circuitry is further configured to cause the display to display a score indicating a reliability of the estimation result.

13. The information processing apparatus according to claim 11, wherein the circuitry is configured to cause the display to display the estimation result as an image in which a region estimated to be a lesion site is highlighted on the second pathology image.

14. The information processing apparatus according to claim 1, wherein the training data further includes Browse history information for the plurality of first pathology images, the Browse history information indicating regions of the first pathology images that a pathologist has browsed for a predetermined amount of time or at a predetermined magnification.

15. The information processing apparatus according to claim 14, wherein the circuitry is further configured to cause a display to display the Browse histories as a heat map superimposed on a whole slide image associated with the basis image.

16. The information processing apparatus according to claim 1, wherein the circuitry is further configured to identify the basis image by calculating a quantitative measure of influence for each of the plurality of first pathology images based on a change in the estimation result when the respective first pathology image is excluded from the training data.

17. The information processing apparatus according to claim 1, wherein the circuitry is further configured to acquire a whole slide image that includes a same image group as the first pathology image identified as the basis image.

18. The information processing apparatus according to claim 1, wherein the circuitry is further configured to cause a display to present the basis image and an image identified from a similar image search of the second pathology image side-by-side.

19. An information processing method comprising:
- deriving an estimation result of diagnosis for a second pathology image using a trained model on which learning has performed using training data including a plurality of first pathology images; and
- identifying a basis image that serves as a basis for derivation of the estimation result by the trained model from the plurality of first pathology images,
- wherein identifying the basis image includes:
  - calculating, for each of the plurality of first pathology images, a change amount in the estimation result that occurs when a respective first pathology image is excluded from the training data, and identifying the basis image based on the calculated change amount; and
- wherein the plurality of first pathology images are each associated with diagnosis information comprising information regarding a diagnostician who has diagnosed the respective first pathology image, and wherein the circuitry is further configured to select the basis image from the plurality of first pathology images based on the information regarding the diagnostician.

20. An information processing system comprising:
- an information processing apparatus that derives, from a pathology image acquired by imaging a specimen prepared from a biological sample, an estimation result of diagnosis for the pathology image; and
- a non-transitory computer-readable storage medium storing a program that causes the information processing apparatus to perform:
- deriving an estimation result of diagnosis for a second pathology image using a trained model on which learning has been performed using training data including a plurality of first pathology images; and
- identifying a basis image that serves as a basis for derivation of the estimation result by the trained model from the plurality of first pathology images, wherein identifying the basis image includes:
  - calculating, for each of the plurality of first pathology images, a change amount in the estimation result that occurs when a respective first pathology image is excluded from the training data, and identifying the basis image based on the calculated change amount; and wherein the plurality of first pathology images are each associated with diagnosis information comprising information regarding a diagnostician who has diagnosed the respective first pathology image, and wherein the circuitry is further configured to select the basis image from the plurality of first pathology images based on the information regarding the diagnostician.

* * * * *